US012574173B2

(12) United States Patent
Li et al.

(10) Patent No.: US 12,574,173 B2
(45) Date of Patent: Mar. 10, 2026

(54) TRANSMISSION OF A TRANSPORT BLOCK BASED ON MULTIPLE TIME UNITS

(71) Applicant: ZTE Corporation, Guangdong (CN)

(72) Inventors: Jian Li, Shenzhen (CN); Xianghui Han, Shenzhen (CN); Chunli Liang, Shenzhen (CN); Shuaihua Kou, Shenzhen (CN); Peng Hao, Shenzhen (CN); Wei Gou, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 375 days.

(21) Appl. No.: 18/348,892

(22) Filed: Jul. 7, 2023

(65) Prior Publication Data

US 2023/0353299 A1 Nov. 2, 2023

Related U.S. Application Data

(63) Continuation of application No. PCT/CN2021/142316, filed on Dec. 29, 2021.

(51) Int. Cl.
*H04L 5/00* (2006.01)
*H04L 1/00* (2006.01)
*H04L 1/08* (2006.01)

(52) U.S. Cl.
CPC .......... *H04L 5/0044* (2013.01); *H04L 1/0068* (2013.01); *H04L 1/08* (2013.01)

(58) Field of Classification Search
CPC ....... H04L 5/0044; H04L 1/0068; H04L 1/08; H04L 1/1664; H04L 1/1819; H04L 1/189;
(Continued)

(56) References Cited

U.S. PATENT DOCUMENTS

2014/0254492 A1* 9/2014 Noh .................. H04W 74/0833
370/328
2016/0182159 A1* 6/2016 Tian .................. H03M 13/2792
375/346
(Continued)

FOREIGN PATENT DOCUMENTS

CN 110365456 A 10/2019
CN 111955025 A 11/2020
(Continued)

OTHER PUBLICATIONS

Ericsson, "TB Processing over Multi-Slot PUSCH," 3GPP TSG-RAN WG1 Meeting #106bis-e; R1-2110123; e-Meeting; Oct. 11-19, 2021 (21 pages).
(Continued)

*Primary Examiner* — Afshawn M Towfighi
(74) *Attorney, Agent, or Firm* — Foley & Lardner LLP

(57) ABSTRACT

Methods, apparatus, and systems that can reduce or eliminate loss of data and/or mismatches between the base station and wireless devices when transmitting uplink data over multiple time units are disclosed. In one example aspect, a method for wireless communication includes performing, by a wireless device, a transmission of a transport block using multiple time units based on a restriction. The transmission of the transport block is associated with a timeline that indicates when control information is transmittable. The restriction specifies that no control information is transmitted in a first time unit that is used for transmitting a first part of the transport block. A second part of the transport block in a second time unit subsequent to the first time unit is punctured in the transmission or proceed by rate matching in response to a conflict between the transport block and the control information according to the timeline.

16 Claims, 26 Drawing Sheets

(58) Field of Classification Search
CPC ..... H04L 1/1671; H04W 72/11; H04W 72/21;
H04W 72/232; H04W 72/1268; H04W
72/0446; H04W 72/231
See application file for complete search history.

(56) References Cited

U.S. PATENT DOCUMENTS

| | | | | |
|---|---|---|---|---|
| 2019/0165880 A1* | 5/2019 | Hakola | | H04L 1/1854 |
| 2020/0146036 A1* | 5/2020 | Gao | | H04L 1/1819 |
| 2022/0303988 A1* | 9/2022 | Yi | | H04L 5/0044 |
| 2024/0080846 A1* | 3/2024 | Yu | | H04L 1/1671 |
| 2024/0188087 A1* | 6/2024 | Zhou | | H04L 1/1671 |
| 2024/0414698 A1* | 12/2024 | Su | | H04L 5/0023 |

FOREIGN PATENT DOCUMENTS

| | | | |
|---|---|---|---|
| KR | 10-2021-0033940 | * | 3/2021 |
| WO | WO-2021/041713 A2 | | 3/2021 |

OTHER PUBLICATIONS

Extended European Search Report for EP App. No. 21969387.6 dated Nov. 29, 2024 (10 pages).
Interdigital, Inc., "TB processing over multiple slots," 3GPP TSG RAN WG1 #106-e; R1-2107651; e-Meeting; Aug. 16-27, 2021 (6 pages).
Samsung, "TB processing over multi-slot PUSCH," 3GPP TSG RAN WG1 #106-e; R1-2106903; e-Meeting; Aug. 16-27, 2021 (7 pages).
International Search Report and Written Opinion for PCT Appl. No. PCT/CN2021/142316, mailed Jun. 1, 2022 (8 pages).
LG Electronics, "Discussions on TB processing over multi-slot PUSCH", 3GPP TSG RAN WG1 #106bis-e, R1-2110097, Oct. 19, 2021, e-Meeting (8 pages).
Moderator (Nokia et al.,) "FL summary #2 of TB processing over multi-slot PUSCH (AI 8.8.1.2)", 3GPP TSG RAN WG1 #106bis-e, R1-2110528, Oct. 9, 2021, e-Meeting (111 pages).

* cited by examiner

400 performing, by a wireless device, a transmission of a transport block using multiple time units based on a restriction specifying that multiplexing of the control information and a part of the transport block is postponed

410

450 receiving, by a base station, a transmission of a transport block from a wireless device using multiple time units based on a restriction specifying that multiplexing of the control information and a part of the transport block is postponed

460

1000 performing, by a wireless device, a transmission of a transport block using multiple time units based on a restriction specifying that no control information is transmitted in a first time unit that is used for transmitting a first part of the transport block
1010 receiving, by a base station, a transmission of a transport block from a wireless device using multiple time units based on a restriction specifying that no control information is transmitted in a first time unit that is used for transmitting a first part of the transport block

1060

1050

TRANSMISSION OF A TRANSPORT BLOCK BASED ON MULTIPLE TIME UNITS

CROSS-REFERENCE TO RELATED APPLICATION

This application claims the benefit of priority under 35 U.S.C. § 120 as a continuation of PCT Patent Application No. PCT/CN2021/142316, filed on Dec. 29, 2021, the disclosure of which is incorporated herein by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that can be implemented to reduce or eliminate loss of data and/or mismatches between the base station and wireless devices when transmitting uplink data over multiple time units so as to provide enhanced coverage for selected channels.

In one example aspect, a method for wireless communication includes performing, by a wireless device, a transmission of a transport block using multiple time units based on a restriction. The transmission of the transport block is associated with a timeline that indicates when control information is transmittable from the wireless device to the base station. The restriction specifies that no control information is transmitted in a first time unit that is used for transmitting a first part of the transport block. A second part of the transport block in a second time unit subsequent to the first time unit is punctured in the transmission or processed by rate-matching in response to a conflict between the transport block and the control information according to the timeline.

In another example aspect, a method for wireless communication includes receiving, by a base station, a transmission of a transport block from a wireless device using multiple time units based on a restriction. The transmission of the transport block is associated with a timeline that indicates when control information is transmittable from the wireless device to the base station. The restriction specifies that no control information is transmitted in a first time unit that is used for transmitting a first part of the transport block. A second part of the transport block in a second time unit subsequent to the first time unit is punctured in the transmission or processed by rate-matching in response to a conflict between the transport block and the control information according to the timeline.

In another example aspect, a method for wireless communication includes performing, by a wireless device, a transmission of a transport block using multiple time units based on a restriction. The transmission of the transport block is associated with a timeline that indicates when control information is transmittable from the wireless device to the base station. The timeline indicates a conflict between the control information and a part of the transport block in a first time unit. The restriction specifies that multiplexing of the control information and the part of the transport block is performed in a second time unit subsequent to the first time unit.

In another example aspect, a method for wireless communication includes receiving, by a base station, a transmission of a transport block from a wireless device using multiple time units based on a restriction. The transmission of the transport block is associated with a timeline that indicates when control information is transmittable from the wireless device to the base station. The timeline indicates a conflict between the control information and a part of the transport block in a first time unit. The restriction specifies that multiplexing of the control information and the part of the transport block is performed in a second time unit subsequent to the first time unit.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Signal coverage is one of the important factors that an operator considers when commercializing cellular communication networks due to its direct impact on service quality. In the Third-Generation Partnership Project (3GPP) Radio Access Network (RAN) plenary #90 e-meeting, a coverage enhancement mechanism for New Radio (NR) communications has been approved to solve the problem of the coverage bottleneck channels, such as the physical uplink shared channel (PUSCH). In particular, for PUSCH transmissions, transport block (TB) transmission over multiple slots (TBoMS) has been proposed as a way for coverage enhancement.

Figure 1:
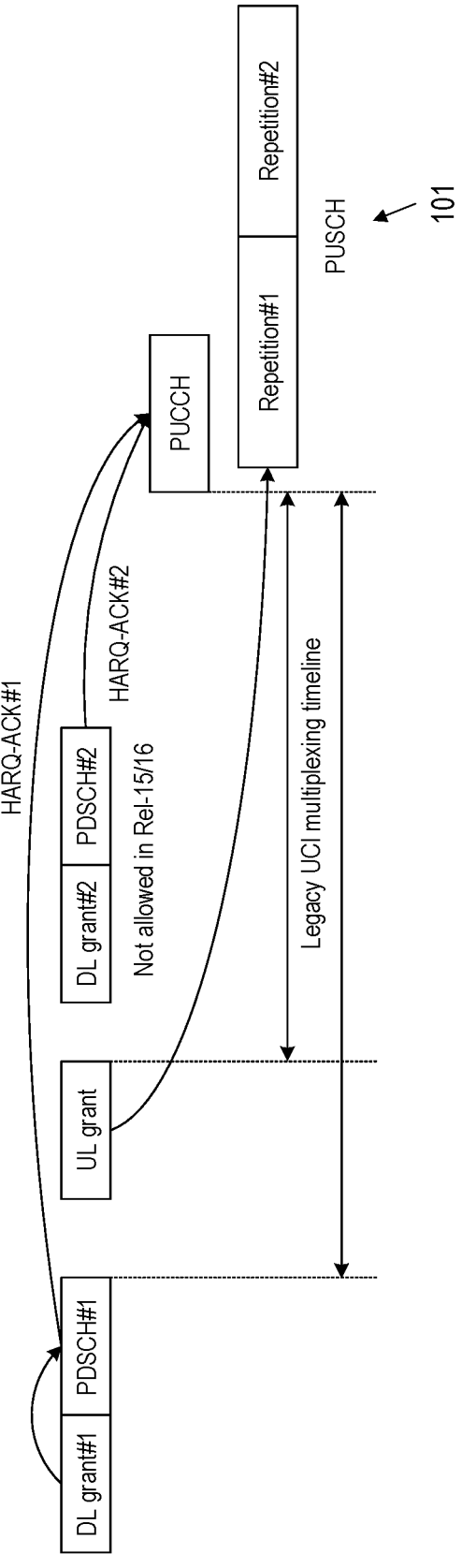
FIG. 1 illustrates an example of a conventional scheduling restriction/timeline requirement of control information multiplexing in Dynamic-Grant (DG) Physical Uplink Shared Channel (PUSCH) transmissions.
Figure 2:
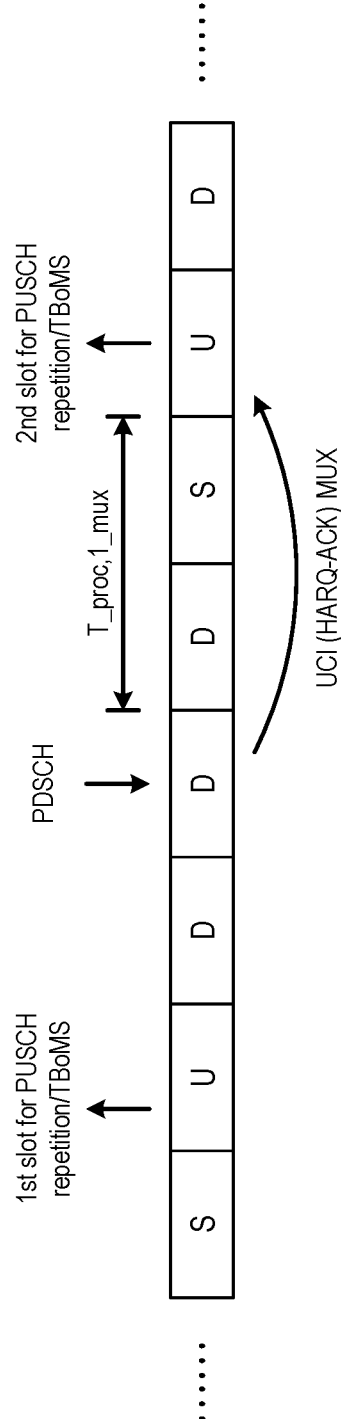
FIG. 2 illustrates an example scheduling restriction/timeline requirement for the Configured-Grant (CG) PUSCH transmissions.

Using the TBoMS transmission, the PUSCH transmission can overlap with control transmissions on the Physical Uplink Control Channel (PUCCH). FIG. 1 illustrates an example of a conventional scheduling restriction/timeline requirement of control information multiplexing (e.g., Hybrid Automatic Repeat Request (HARQ) Acknowledgement (ACK) multiplexing) in Dynamic-Grant (DG) PUSCH transmissions. According to the timeline requirement, the Uplink Control Information (UCI) bits that include the HARQ-ACK are known prior to the first slot of the PUSCH transmission 101. FIG. 2 illustrates an example scheduling restriction/timeline requirement for the Configured-Grant (CG) PUSCH in which the requirement is checked per slot.

Figure 3A:
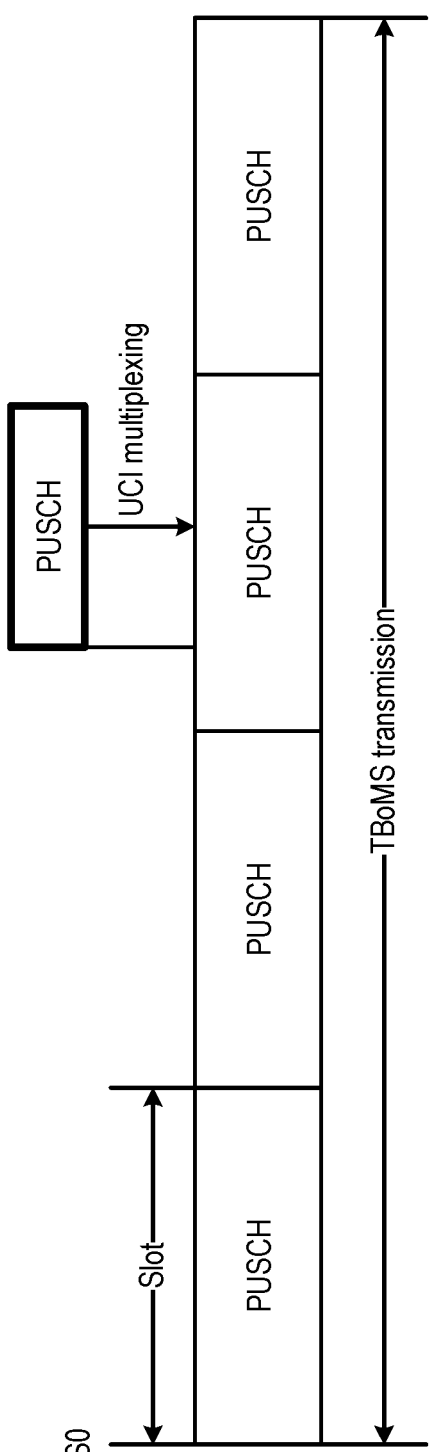
FIG. 3A illustrates a first option of rate-matching mechanisms for Transport Block over Multiple Slots (TBoMS) transmissions.
Figure 3B:
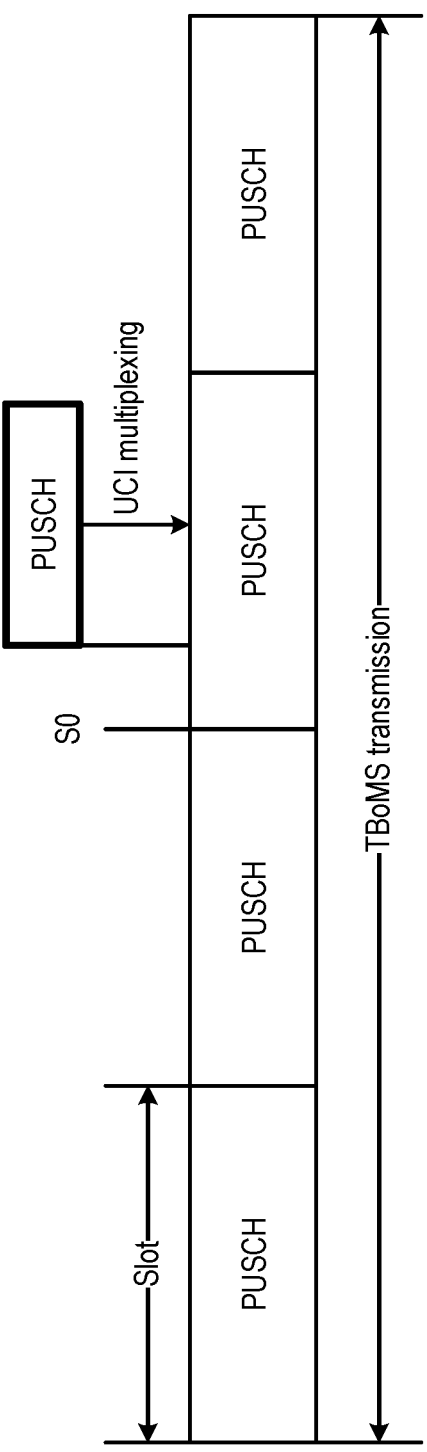
FIG. 3B illustrates a second option of rate-matching mechanisms for TBoMS transmissions.

FIGS. 3A-3B illustrates examples of rate-matching mechanisms for TBoMS that have been discussed in the 3GPP meetings. FIG. 3A illustrates a first option in which, for a particular slot in the TBoMS transmission, the index of the starting coded bit in the circular buffer is the index continuous from the position of the last bit selected in the previous allocated slot. In this option, $S_0$ is defined as the time-domain position of the earliest symbol of CG PUSCH in the first slot of TBoMS transmission. This option can impact the legacy UCI multiplexing timeline, at least for CG-PUSCH Type 2, and similar to the timeline requirement shown in FIG. 1, in this option information related to UCI multiplexing needs to be available prior to the start of the TBoMS transmission. However, DCI signaling may be lost during the transmission, leading to DCI detection failures and mismatch between the base station and the UE in the TMoMS transmission.

FIG. 3B illustrates a second option in which the index of the starting coded bit in the circular buffer is the index continuous from the position of the last bit selected in the previous allocated slot, regardless of whether UCI multiplexing occurred in the previous allocated slot or not. In this option, $S_0$ is defined as the time-domain position of the earliest symbol of CG PUSCH in the slot with overlapping PUCCH and PUSCH transmissions. In this option, rate-matching is replaced with puncturing, a new UCI multiplexing procedure for UCI of more than 2 bits. That is, the PUSCH bits can be punctured so that UCI bits can be multiplexed with the PUSCH transmission. However, data loss caused by puncturing can lead to performance loss, especially when the punctured bits carry important system information.

This patent document discloses techniques that can be implemented in various embodiments to reduce and/or eliminate the mismatch between the base station and the UEs and the information loss due to puncturing. In particular, alternative multiplexing/scheduling restrictions can be used to ensure that important systematic bits are not lost in the puncturing and/or the base station and the UE are consistent in applying the UCI multiplexing timeline, thereby improving the performance of TBoMS transmissions.

Figure 4A:
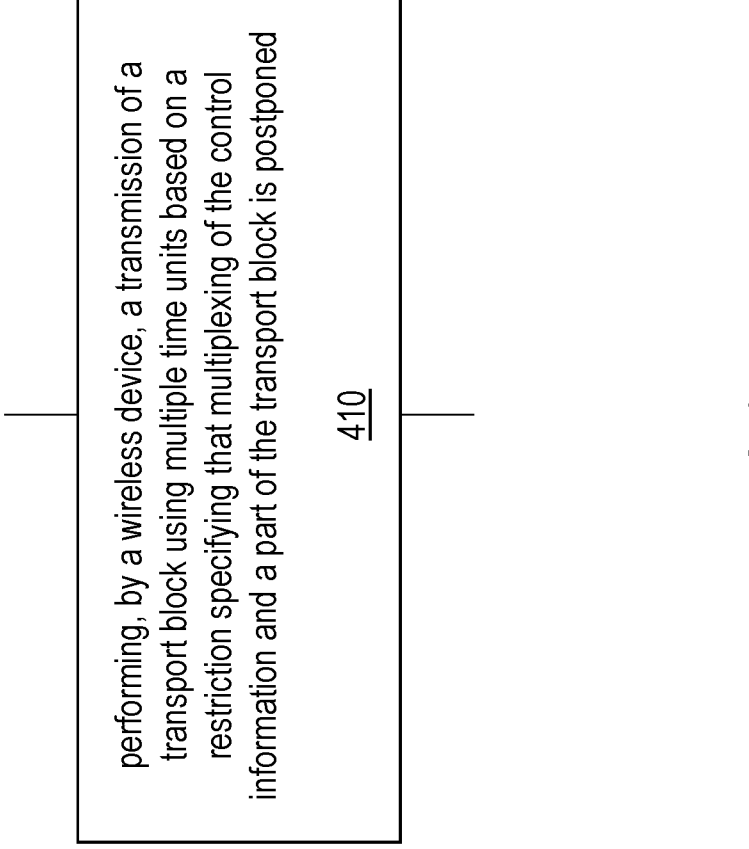
FIG. 4A is a flow chart representation of a method for wireless communication in accordance with one or more embodiments of the present technology.

In some embodiments, the UCI multiplexing can be postponed or adjusted to other slots in the TBoMS transmission. FIG. 4A is a flow chart representation of a method 400 for wireless communication in accordance with one or more embodiments of the present technology. The method 400 includes, at operation 410, performing, by a wireless device, a transmission of a transport block using multiple time units based on a restriction. The transmission of the transport block is associated with a timeline that indicates when control information is transmittable from the wireless device to the base station. There exists a conflict between the control information and a part of the transport block in a first time unit according to the timeline. The restriction specifies that multiplexing of the control information and the part of the transport block is performed in a second time unit subsequent to the first time unit.

Figure 4B:
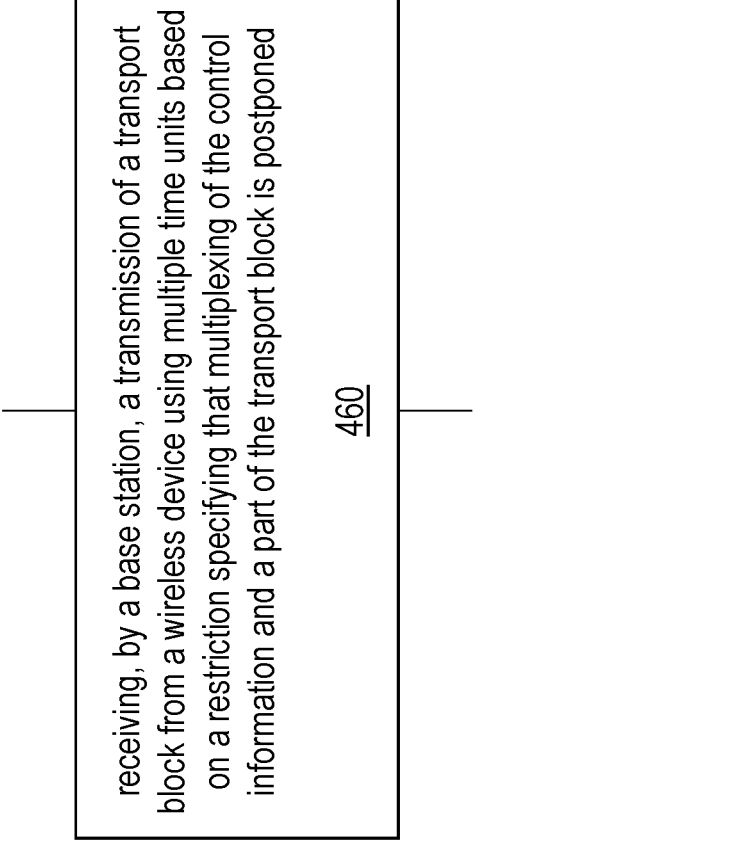
FIG. 4B is a flow chart representation of another method for wireless communication in accordance with one or more embodiments of the present technology.

FIG. 4B is a flow chart representation of a method 450 for wireless communication in accordance with one or more embodiments of the present technology. The method 450 includes, at operation 460, receiving, by a base station, a transmission of a transport block from a wireless device using multiple time units based on a restriction. The transmission of the transport block is associated with a timeline that indicates when control information is transmittable from the wireless device to the base station. There exists a conflict between the control information and a part of the transport block in a first time unit according to the timeline. The restriction specifies that multiplexing of the control information and the part of the transport block is performed in a second time unit subsequent to the first time unit.

In some embodiments, the second time unit is a last time unit for the transmission of the transport block. In some embodiments, the timeline specifies that a part of the control information in the second time unit is omitted in the transmission in response to the multiplexing. In some embodiments, the timeline specifies that a first part of the control information is scheduled to be transmittable in the second time unit, and the restriction specifies that remaining part of the control information is combined with the first part of the control information in the transmission. In some embodiments, a number of bits in the subsequent time unit for carrying the control information is recalculated by the wireless device. In some embodiments, in response to the multiplexing, the control information in different time units specified by the timeline is concatenated. In some embodiments, the control information is concatenated according to a Semi-Persistent Scheduling index.

In some embodiments, the multiple time units are consecutive in a time domain (e.g., the Frequency-Division Duplexing (FDD) structure). In some embodiments, the multiple time units are non-consecutive in a time domain (e.g., the Time-Division Duplexing (TDD) structure). In some embodiments, the time unit comprises a slot.

In some embodiments, the control information comprises at least one of: Hybrid Automatic Repeat Request (HARQ) Acknowledgment (ACK) carried by N bits, N being smaller than or equal to two bits; HARQ ACK carried by M bits, M being greater than two bits; a first part of Channel Station Information (CSI); or a second part of CSI. In some embodiments, the control information comprises more than 2 bits of HARQ-ACK or CSI information.

In some embodiments, the transmission of the transport block comprises a Configured-Grant (CG) Physical Uplink Shared Channel (PUSCH) transmission or a Dynamic-Grant (DG) PUSCH transmission, where the CG-PUSCH transmission further comprises a Type 2 CG-PUSCH transmission.

In some embodiments, a grant message from the base station to the wireless device includes a parameter indicating the restriction associated with the timeline. In some embodiments, the parameter indicates a time domain location of the second time unit. In some embodiments, a Radio Reconfiguration Configuration (RRC) message from the base station to the wireless device indicates whether the restriction is enabled for the transmission.

In some embodiments, the restriction is applicable to a new data transmission or a data retransmission. In some embodiments, the restriction is applicable to a single transmission or repetitive transmissions of the transmission.

Some examples of the disclosed techniques shown in FIGS. 4A-B are further described in the following example Embodiments 1-3.

Embodiment 1

As discussed above, the problem with the option shown in FIG. 3A is that, due to potential loss of DCI information, it is difficult to get the accurate UCI multiplexing bits in the earliest symbol of the first slot of TBoMS transmission. As a result, the misalign between the UE and the gNB can start early (e.g., from the second slot in the TBoMS) and impact the entire TBoMS.

Figure 5:
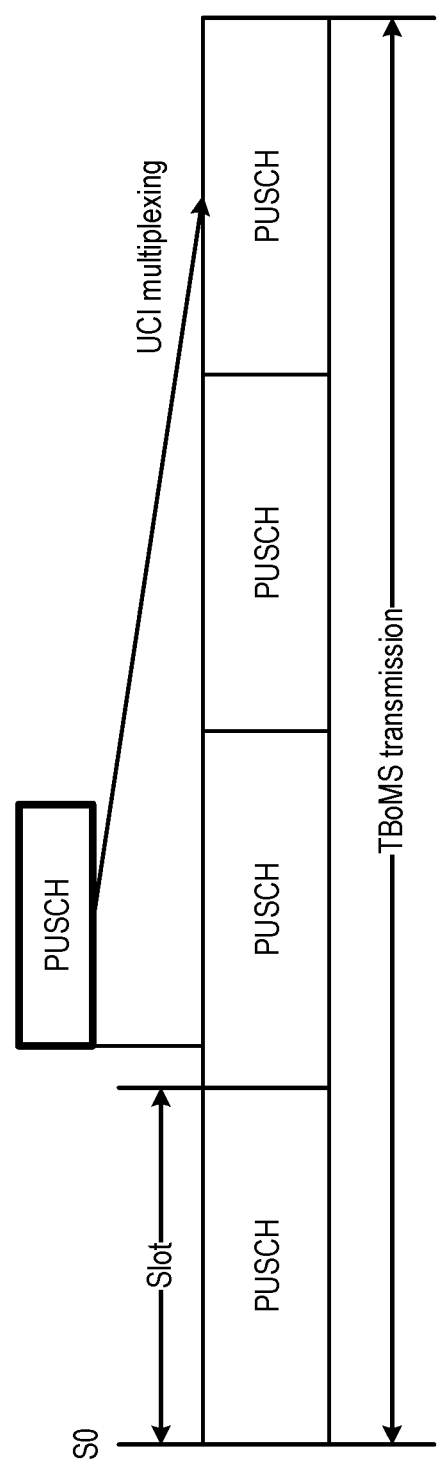
FIG. 5 illustrates an example postponement of UCI multiplexing in accordance with one or more embodiments of the present technology.

To address this problem, the UCI multiplexing can be postponed to another slot (e.g., a later slot in the time domain). FIG. 5 illustrates an example postponement of UCI multiplexing in accordance with one or more embodiments of the present technology. In some embodiments, the other slot is the last available slot for the TBoMS transmission such that, even when DCI missing detection occurs, the misalignment between the UE and the base station only impacts the last available slot in the TBoMS.

In some embodiments, when there is a conflict between the originally scheduled UCI and the transmission in the last available slot (e.g., additional UCI scheduled in the last available slot), the original scheduled UCI can be dropped. Alternatively, the originally scheduled UCI can be combined with the UCI scheduled on the last available slot. The number of UCI bits and the number of resources occupied by the UCI can be recalculated based on the postpone timeline. In some embodiments, the new UCI and the original UCI can be combined in a serial manner. For example, Semi-Persistent Scheduling (SPS) HARQ-ACK information can be concatenated in series according to SPS index. Then the DG HARQ-ACK can be further concatenated at the end of SPS HARQ-ACK.

In some embodiments, if the TBoMS repetition is enabled, the UCI multiplexing restriction can be applicable to the transmission of the transport block is a first repetition of repetitive transmissions of the transport bock. For the remaining repetitions of the repetitive transmissions, the multiplexing restriction may not be applicable.

In some embodiments, if the TBoMS repetition is enabled, the UCI multiplexing restriction is applicable to at least part of repetitive transmissions of the transport bock regardless of the redundancy version of the repetition(s). In some embodiments, the UCI multiplexing restriction can be applicable to each repetition regardless of a redundancy version of the repetition. For example, the restriction can be applicable two TBoMS repetitions have different RV values (e.g., RV0 and RV3).

In some embodiments, the transmission of the transport block is part of repetitive transmissions of the transport bock, and the restriction is applicable to one or more repetitions of the transport block having a specific redundancy version. For example, the restriction is only applicable to repetitions that have the same RV value (e.g., RV0).

In some embodiments, as shown in FIG. 1, a DL grant followed by a UL is not allowed in the R15/16 of the 3GPP standard. However, the DL grant can be after the UL grant; the UCI can be multiplexed on the subsequent repetition, e.g., repetition 2.

In some embodiments, the last available slot is the last slot of the TBoMS transmission. In some embodiments, the last available slot is the last slot in which the multiplexing and transmission of the UCI can actually happen. For example, the last slot cannot be used for the transmission for reasons such as slot format collision, the UCI can be multiplexed in the penultimate slot.

Figure 6:
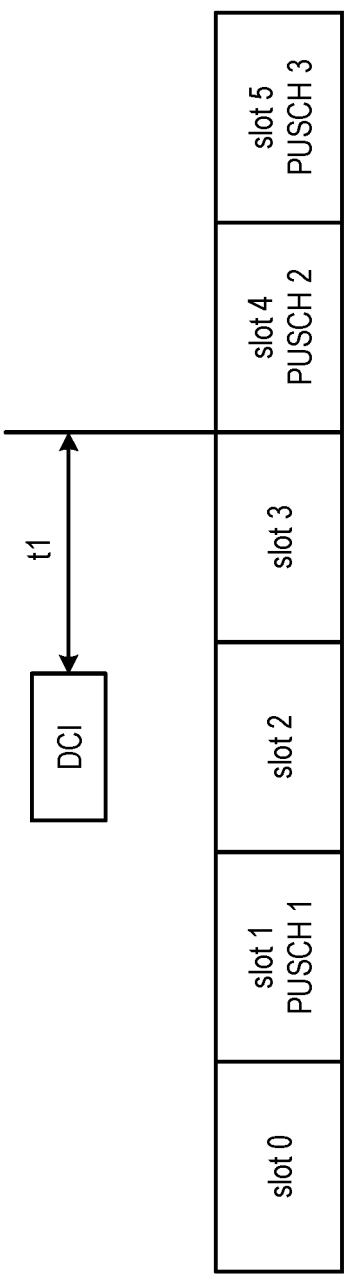
FIG. 6 illustrates an example of determining a time-domain position for UCI multiplexing in accordance with one or more embodiments of the present technology.

FIG. 6 illustrates an example of determining a time-domain position for UCI multiplexing in accordance with one or more embodiments of the present technology. In this example, slot 1, slot 4 and slot 5 are allocated for a TBoMS transmission. Slot 4 and slot 5 include flexible symbols configured by the Radio Resource Configuration (RRC) signaling. Based on the configuration, the UE determines that UCI is multiplexed in the last slot, e.g., PUSCH 3 in slot 5. However, the DCI received in slot 2 indicates that slot 5 is downlink slot, which means that PUSCH 3 cannot be transmitted in slot 5 and UCI needs to be multiplexed in a different slot, e.g., PUSCH 2 in previous slot 4. Here, the DCI can be a dynamic Slot Format Information (SFI) DCI, an inter-UE cancellation DCI, or a DCI scheduling an uplink channel with a high physical layer (PHY) priority.

The slot position for UCI multiplexing and transmission can be determined based on the time internal between the reception of the DCI by the UE and the next UCI multiplexing candidate. In this specific example, due to slot 5 being a downlink slot, PUSCH 2 (slot 4) becomes the last available slot in the TBoMS transmission for multiplexing UCI information. The time interval between the DCI and the PUSCH 2 can be referred to as t1. If there is sufficient time to perform UCI multiplexing in PUSCH 2 (e.g., t1 is greater than or equal to a predefined threshold according to the multiplex timeline, such as $T_{mux}$ as defined in the 3GPP standard, and $T_{mux}$ is the time needed for UCI multiplexing in the PUSCH defined by the protocol), the UCI is multiplexed in the PUSCH 2 (e.g., the information is combined and/or concatenated). If there is not sufficient time (e.g., t1 is smaller than the predefined threshold), the UCI information can be dropped from transmission. In some embodiments, the UCI information is dropped when there is no available slot to multiplex the UCI (e.g., both slot 4 and slot 5 are downlink slots).

In some embodiments, the delay of the HARQ-ACK information needs to be accounted for in the postponement. For example, if PUSCH 3 is also overlapped with UCI (e.g., HARQ-ACK) that needs to be postponed, different parts of the UCI can be concatenated independently.

In some embodiments, to avoid dropping or omission of the UCI, the last slot can be the last slot with at least some or all symbols of the PUSCH indicated as UL symbols by RRC signaling, e.g., UL slot. That is, the base station and the UE follow a restriction specifying that the UCI (e.g., HARQ-ACK) is not to overlap with slots having flexible symbols in TBoMS transmission if there is no subsequent UL slot for TBoMS transmission. For example, referring back to FIG. 6, if slot 4 and slot 5 are indicated as having flexible symbols, the UCI needs to be multiplexed in PUSCH 1 because the HARQ-ACK cannot be scheduled on slot 4 or slot 5.

In some embodiments, the methods above can be extended to the PUSCH repetition. When PUSCH repetition is configured, if the UE misses the DL DCI while the UL grant indicates there is HARQ-ACK to be multiplexed, it does not know which slots the PUCCH overlaps with. In some embodiments, the HARQ-ACK can be multiplexed in the last PUSCH repetition as discussed above. In some embodiments, such postponement can be applied to both PUSCH repetition type A and type B. In some embodiments, if the TBoMS and repetition are enabled together, the UCI is multiplexed in the last transmission of first TBoMS repetition. In some embodiments, if the TBoMS and repetition are enabled together, the UCI is multiplexed in the last transmission of all TBoMS repetitions.

In some embodiments, when PUSCH repetition or TBoMS is configured, a plurality of PUSCHs is transmitted by the UE for a TB. The HARQ-ACK information can be multiplexed in a specific PUSCH within the plurality of PUSCHs. This specific PUSCH can be configured by the network or specified by the protocol. For example, the specific PUSCH can be the first, the second, or the last PUSCH of the plurality of PUSCHs. In some embodiments, the specific PUSCH can be the first or the last PUSCH whose symbols are all UL symbols as indicated by RRC signaling. If there is a PUCCH resource for HARQ-ACK information transmission overlapping with any of the plurality of PUSCHs, the HARQ-ACK information is multiplexed in this specific PUSCH. In some embodiments, if the UE does not receive any DCI scheduling PDSCH with the corresponding PUCCH resource overlapping with the plurality of the PUSCHs, and the Downlink Assignment Indicator (DAI) in the UL grant is equal to a specific value indicating the number of subframes with PDSCH, the HARQ-ACK information is multiplexed in this specific PUSCH. For example, the specific value of DAI can be 1 or not equal to 4. The UL grant schedules the plurality of PUSCHs. The DAI value in the UL grant is used for generating the HARQ-ACK information for multiplexing. If this specific PUSCH cannot be transmitted or is canceled, the HARQ-ACK information is multiplexing in the next or the previous PUSCH that the UE can transmit. Alternatively, if this specific PUSCH cannot be transmitted or is canceled, the HARQ-ACK information is dropped as well.

In some embodiments, if the UE receives a UL grant with DAI equal to a specific value (e.g., 1 or not equal to 4), the HARQ-ACK information is multiplexed in each of the plurality of PUSCHs. The UL grant schedules the plurality of PUSCHs.

In some embodiments, for TBoMS transmission, one UL grant schedules the PUSCH on multiple slots. If the DL grant DCI fails to be detected by the UE and the UL grant indicates the total DAI in UL grant to perform HARQ-ACK multiplexing in PUSCH, but the UE does not know which slot of TBoMS PUSCH transmission the HARQ-ACK is multiplexed, the UE can multiplex the HARQ-ACK on each slot of TBoMS PUSCH transmission. In this case, the number of HARQ-ACK bit on each slot can be the same as the gNB scheduling, and the UE does not expect the number of HARQ-ACK bits on each slot of TBoMS PUSCH transmission to be different. In some embodiments, the number of HARQ-ACK bits on each slot of TBoMS PUSCH transmission can be different, e.g., the HARQ-ACK is multiplexed on part of slot, but the total DAI in UL grant is same for each slot and bit padding can be adopted. In some embodiments, the methods above can be extended to the PUSCH repetition.

In some embodiments, within the methods above, the UE and the network can achieve the same understanding on the UCI multiplexing in the PUSCH to provide an basic knowledge for the network decoding.

Embodiment 2

Figure 7:
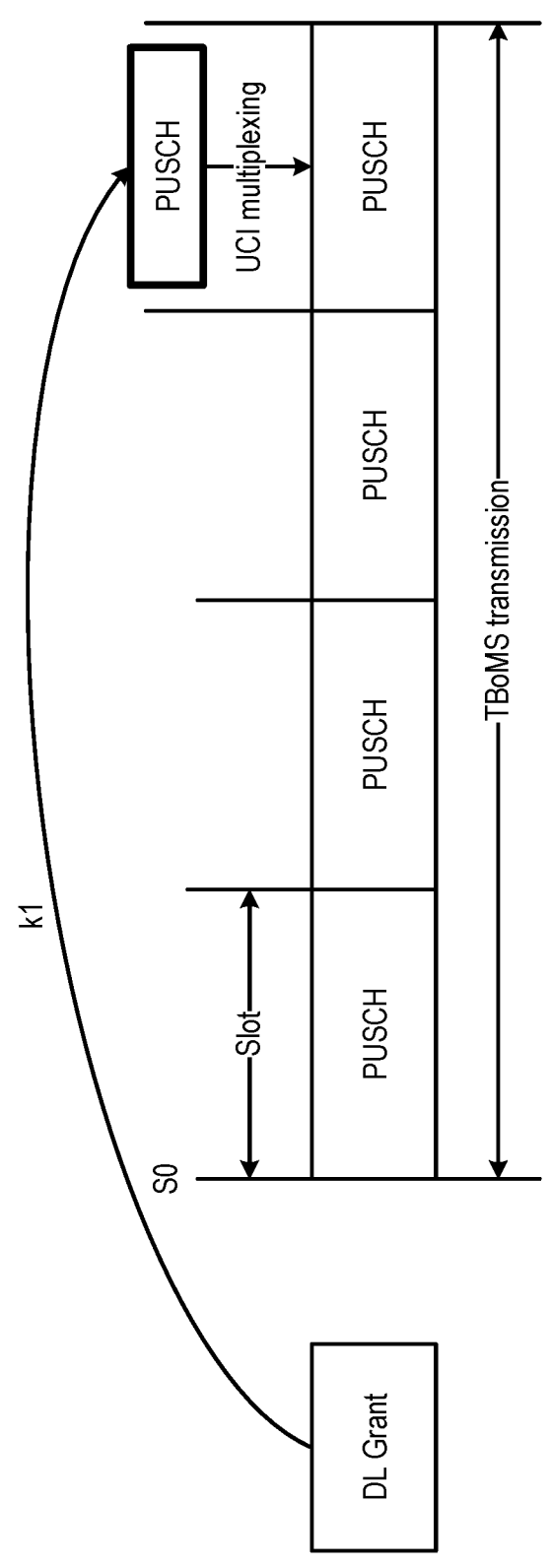
FIG. 7 illustrates an example of indicating a scheduling/multiplexing restriction in accordance with one or more embodiments of the present technology.

In some embodiments, the scheduling/multiplexing restriction discussed in Embodiment 1 can be indicated by the base station via a signaling message (e.g., a DCI grant on the physical layer), eliminating the need for the UE to determine whether the UCI information is to be multiplexed or dropped, and/or in which slot UCI multiplexing should be performed. For example, as shown in FIG. 7, a value k1 that indicates the time domain position for UCI multiplexing is included in a downlink grant signaling message. Upon receiving the value k1, the UE can perform UCI multiplexing according to the value k1. In some embodiments, whether the scheduling/multiplexing restriction is indicated by the base station can be configured using a higher layer signaling message (e.g., RRC signaling). For example, the base station can determine whether or when to adopt the scheduling restriction and informs the UE through RRC signaling.

Embodiment 3

Figure 8A:
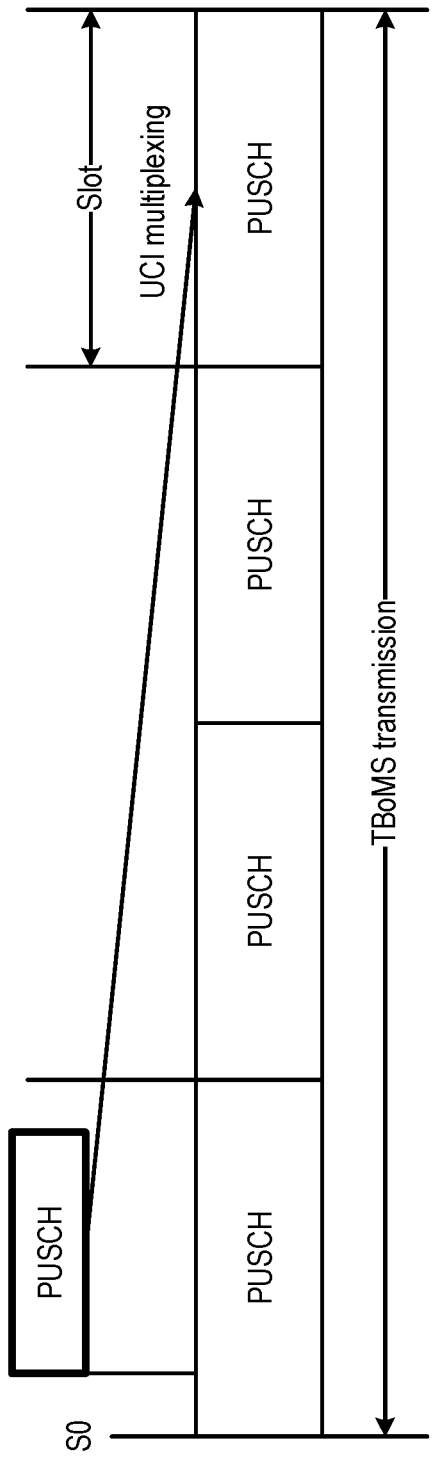
FIG. 8A illustrates an example postponement of UCI multiplexing as a replacement of puncturing in accordance with one or more embodiments of the present technology.
Figure 8B:
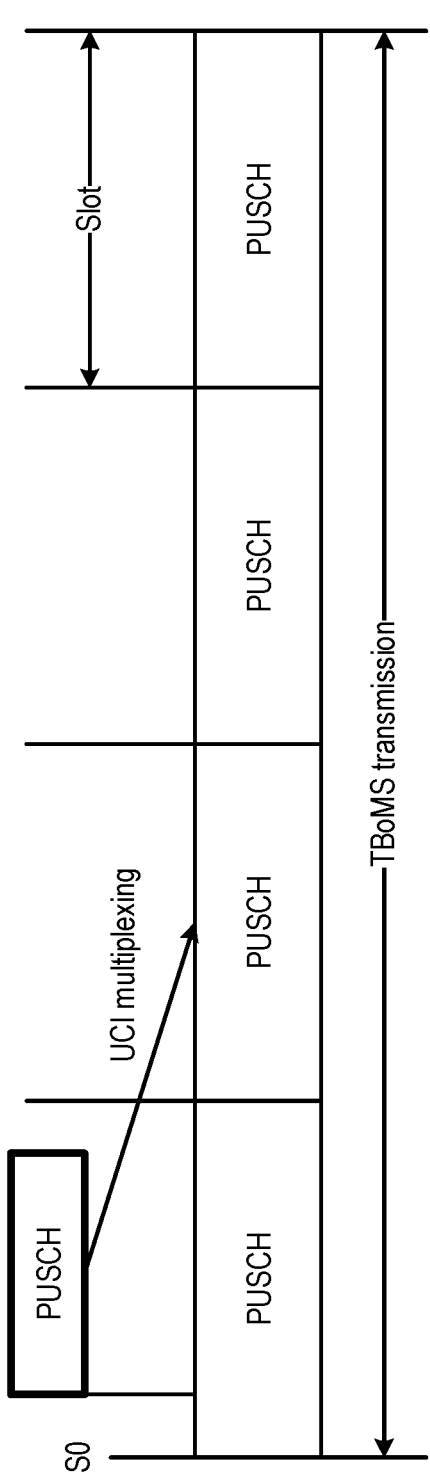
FIG. 8B illustrates another example postponement of UCI multiplexing as a replacement of puncturing in accordance with one or more embodiments of the present technology.

Referring back to the option shown in FIG. 3B, the problem of the second option is that the PUSCH transmission performance can be severely impacted when the systematic bits are punctured. Instead of puncturing the bits, the UCI information can be multiplexed instead of punctured, and the multiplexing can be postponed to a subsequent slot. For example, the subsequent slot can be the last available slot in the TBoMS transmission (e.g., as shown in FIG. 8A) or the next adjacent available slot (e.g., as shown in FIG. 8B). The subsequent slot can also be any other slots in the TBoMS transmission that is positioned after the slot originally scheduled for PUCCH transmission.

In some embodiments, when there is a conflict between the originally scheduled UCI and the transmission in the last available slot (e.g., additional UCI scheduled in the last available slot), the original scheduled UCI can be dropped. Alternatively, the originally scheduled UCI can be combined with the UCI scheduled on the last available slot. The number of UCI bits and the number of resources occupied by the UCI can be recalculated based on the postpone timeline. In some embodiments, the new UCI and the original UCI can be combined in a serial manner. For example, Semi-Persistent Scheduling (SPS) HARQ-ACK information can be concatenated in series according to SPS index. Then the DG HARQ-ACK can be further concatenated at the end of SPS HARQ-ACK. In some embodiments, the delay of the HARQ-ACK information needs to be accounted for in the postponement—different parts of the UCI can be concatenated independently in the multiplexing process.

Figure 9A:
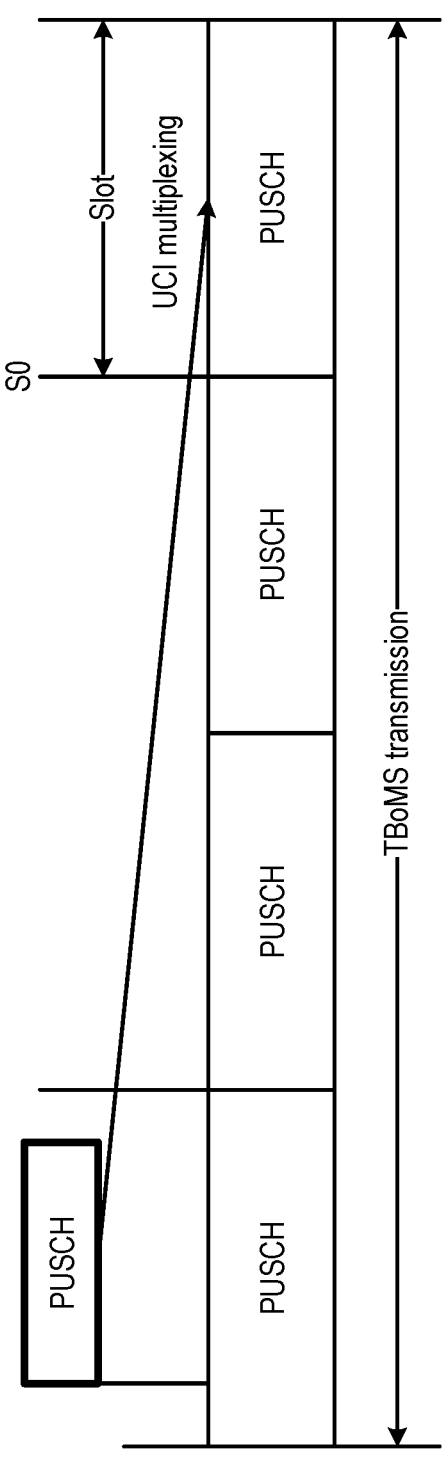
FIG. 9A illustrates another example postponement of UCI multiplexing as a replacement of puncturing in accordance with one or more embodiments of the present technology.
Figure 9B:
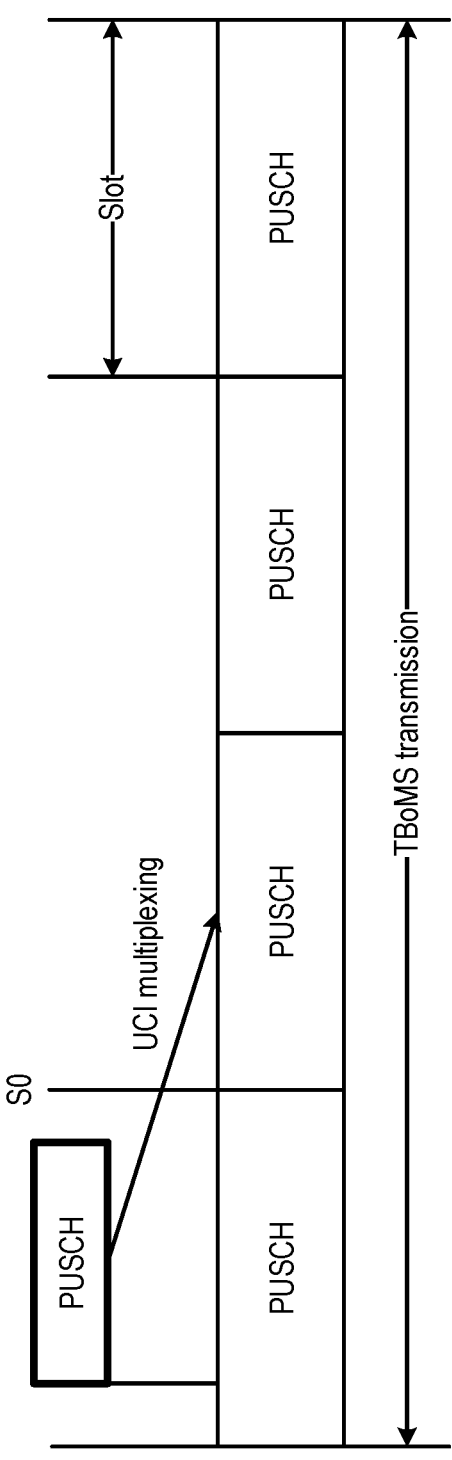
FIG. 9B illustrates yet another example postponement of UCI multiplexing as a replacement of puncturing in accordance with one or more embodiments of the present technology.

In some embodiments, the postponement of the UCI multiplexing can be applied regardless of how $S_0$ is defined in the UCI timeline. For example, as shown in FIGS. 9A-B, $S_0$ can be flexibly defined as the time-domain position of a symbol in any slot having non-overlapping PUCCH or PUSCH transmissions.

Figure 10A:
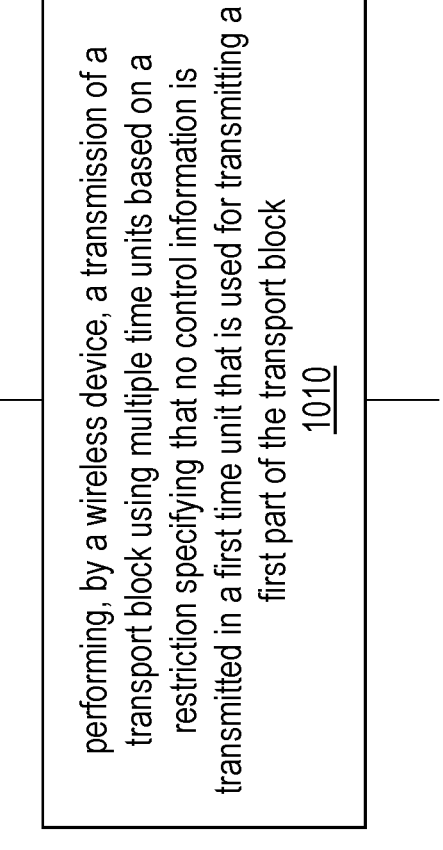
FIG. 10A is a flow chart representation of a method for wireless communication in accordance with one or more embodiments of the present technology.

In some embodiments, as discussed in connection with FIG. 3B, the UCI multiplexing can be achieved by postponing or adjusting the puncturing of one or more bits in the transmission. FIG. 10A is a flow chart representation of a method 1000 for wireless communication in accordance with one or more embodiments of the present technology. FIG. 10A is a flow chart representation of a method 1000 for wireless communication in accordance with one or more embodiments of the present technology. The method 1000 includes, at operation 1010, performing, by a wireless device, a transmission of a transport block using multiple time units based on a restriction. The transmission of the transport block is associated with a timeline that indicates when control information is transmittable from the wireless device to the base station. The restriction specifies that no control information is transmitted in a first time unit that is used for transmitting a first part of the transport block. A second part of the transport block in a second time unit subsequent to the first time unit is punctured in the transmission or processed by rate-matching in response to a conflict between the transport block and the control information according to the timeline.

Figure 10B:
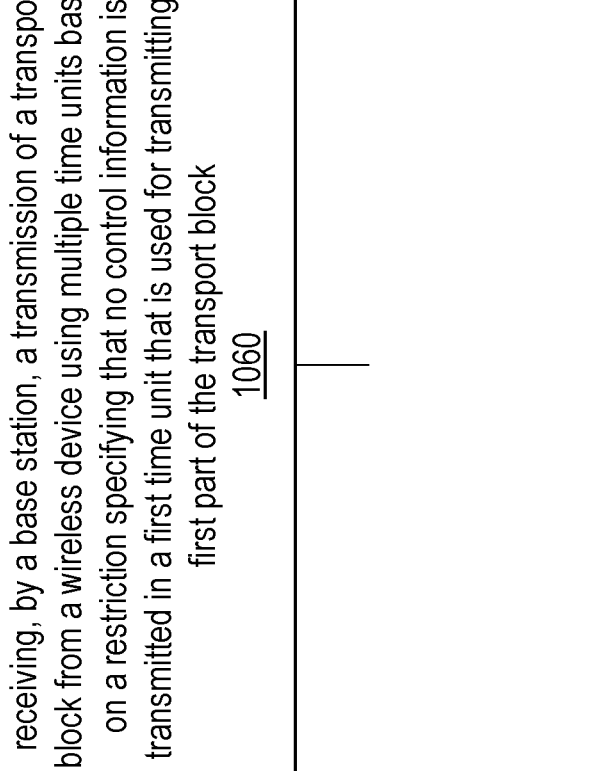
FIG. 10B is a flow chart representation of another method for wireless communication in accordance with one or more embodiments of the present technology.

FIG. 10B is a flow chart representation of a method 450 for wireless communication in accordance with one or more embodiments of the present technology. The method 450 includes, at operation 460, receiving, by a base station, a transmission of a transport block from a wireless device using multiple time units based on a restriction. The transmission of the transport block is associated with a timeline that indicates when control information is transmittable from the wireless device to the base station. The restriction specifies that no control information is transmitted in a first time unit that is used for transmitting a first part of the transport block. A second part of the transport block in a second time unit subsequent to the first time unit is punctured in the transmission or processed by rate-matching in response to a conflict between the transport block and the control information according to the timeline.

In some embodiments, the multiple time units are consecutive in a time domain (e.g., the Frequency-Division Duplexing (FDD) structure). In some embodiments, the multiple time units are non-consecutive in a time domain (e.g., the Time-Division Duplexing (TDD) structure). In some embodiments, the time unit comprises a slot.

In some embodiments, the control information comprises at least one of: Hybrid Automatic Repeat Request (HARQ) Acknowledgment (ACK) carried by N bits, N being smaller than or equal to two bits; HARQ ACK carried by M bits, M being greater than two bits; a first part of Channel Station Information (CSI); or a second part of CSI. In some embodiments, the control information comprises more than 2 bits of HARQ-ACK or CSI information.

In some embodiments, the transmission of the transport block comprises a Configured-Grant (CG) Physical Uplink Shared Channel (PUSCH) transmission or a Dynamic-Grant (DG) PUSCH transmission, where the CG-PUSCH transmission further comprises a Type 2 CG-PUSCH transmission.

In some embodiments, a grant message from the base station to the wireless device includes a parameter indicating the restriction associated with the timeline. In some embodiments, the parameter indicates a time domain location of the second time unit. In some embodiments, a Radio Reconfiguration Configuration (RRC) message from the base station to the wireless device indicates whether the restriction is enabled for the transmission.

In some embodiments, the restriction is applicable to a new data transmission or a data retransmission. In some embodiments, the restriction is applicable to a single transmission or repetitive transmissions of the transmission. In some embodiments, the transmission of the transport block is a first repetition of repetitive transmissions of the transport bock, and the restriction is inapplicable to remaining repetitions of the repetitive transmissions. In some embodiments, the transmission of the transport block is part of repetitive transmissions of the transport bock, and the restriction is applicable to each repetition regardless of a redundancy version of the repetition. In some embodiments, the transmission of the transport block is part of repetitive transmissions of the transport bock, and the restriction is applicable to one or more repetitions of the transport block having a specific redundancy version.

Some examples of the disclosed techniques shown in FIGS. 10A-B are further described in the following example Embodiment 4.

Embodiment 4

An alternative way to address the loss of systematic bits in puncturing is to have a restriction on when puncturing can occur in the TBoMS transmission. Often times, the important bits are caned in the first slot or the first few slots in the TBoMS. To avoid or minimize information loss during puncturing, the UE can perform puncturing or rate-matching according to a rule specifying that the PUSCH does not conflict with the first transmission opportunity (e.g., the first available slot or the first few available slots) of the TBoMS transmission. That is, the base station postpones the UCI multiplexing timeline to later slot(s) of the TBoMS so that puncturing and/or rate-matching can have minimal impact on the data transmission.

Figure 11A:
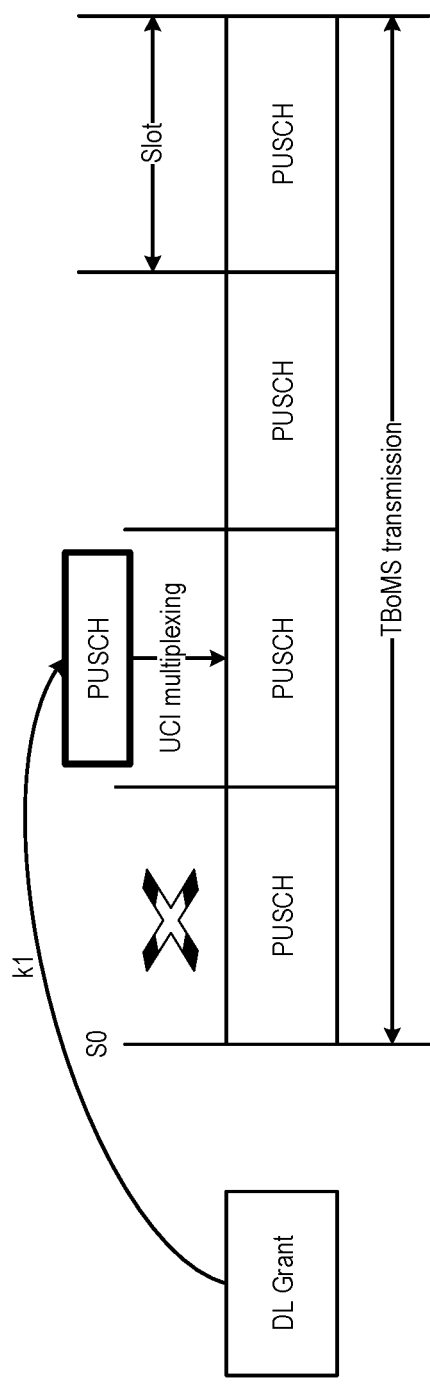
FIG. 11A illustrates an example of indicating a scheduling/multiplexing restriction in accordance with one or more embodiments of the present technology.
Figure 11B:
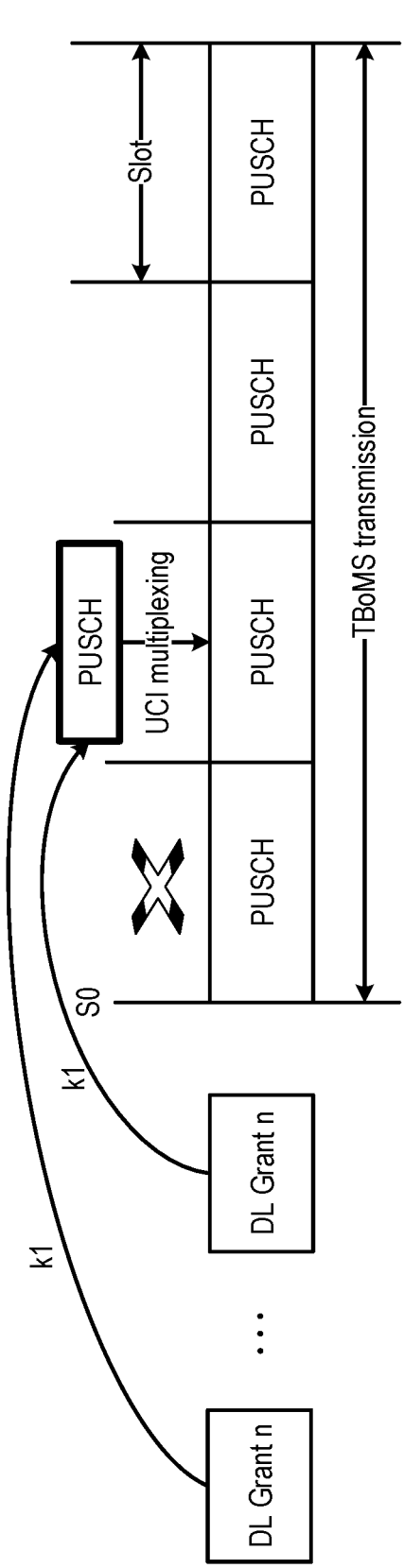
FIG. 11B illustrates another example of indicating a scheduling/multiplexing restriction in accordance with one or more embodiments of the present technology.

In some embodiments, the restrictions can be indicated by the base station via a signaling message (e.g., a DCI grant on the physical layer), eliminating the need for the UE to determine whether the UCI information is to be multiplexed or dropped and/or in which slot UCI multiplexing should be performed. For example, as shown in FIG. 11A, a DL grant includes a value k1 that indicates the slot for UCI multiplexing. FIG. 11B shows an example of using multiple DL grant messages to indicate the value k1 in accordance with one or more embodiments of the present technology.

In some embodiments, whether the restriction is indicated by the base station can be configured using a higher layer signaling message (e.g., RRC signaling). For example, the base station can determine whether and/or when to adopt the scheduling restriction and informs the UE through RRC signaling.

Figure 12A:
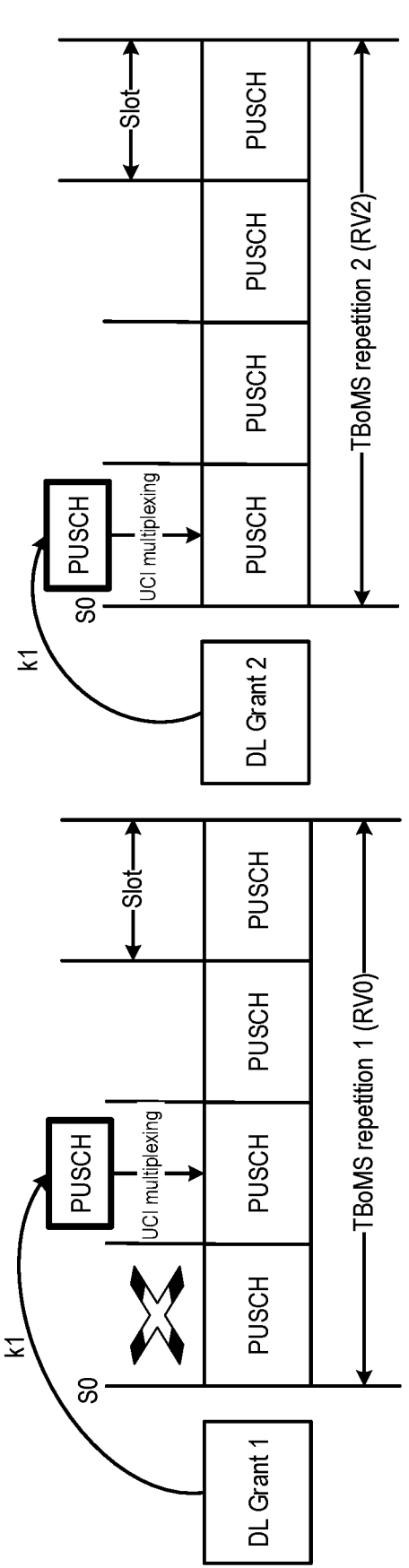
FIG. 12A illustrates an example of indicating a scheduling/multiplexing restriction in PUSCH repetitions in accordance with one or more embodiments of the present technology.

In some embodiments, as shown in FIG. 12A, the transmission of the transport block is a first repetition of repetitive transmissions of the transport bock, and the restriction (e.g., that the PUCCH does not conflict with the first PUSCH slot) is inapplicable to remaining repetitions of the repetitive transmissions.

Figure 12B:
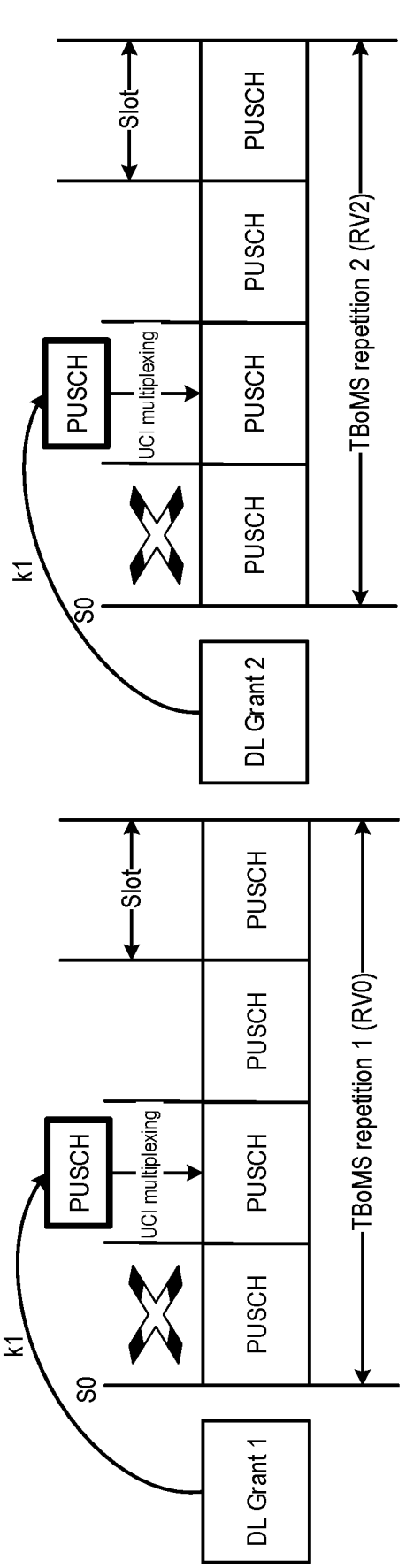
FIG. 12B illustrates another example of indicating a scheduling/multiplexing restriction in PUSCH repetitions in accordance with one or more embodiments of the present technology.

In some embodiments, the transmission of the transport block is part of repetitive transmissions of the transport bock, and the restriction (e.g., that the PUCCH does not conflict with the first PUSCH slot) is applicable to each repetition regardless of a redundancy version of the repetition. As shown in FIG. 12B, two TBoMS repetitions have different RV values: RV0 and RV2. The restriction is still applicable to each repetition.

Figure 12C:
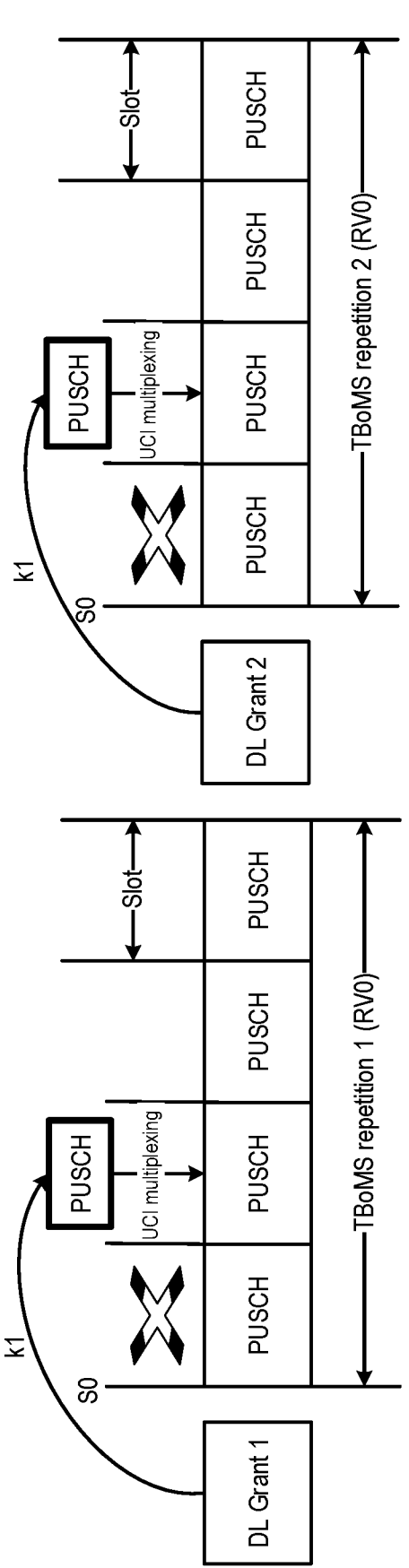
FIG. 12C illustrates yet another example of indicating a scheduling/multiplexing restriction in PUSCH repetitions in accordance with one or more embodiments of the present technology.

In some embodiments, the transmission of the transport block is part of repetitive transmissions of the transport bock, and the restriction is applicable to one or more repetitions of the transport block having a specific redundancy version. As shown in FIG. 12C, the restriction is only applicable to repetitions that have the same RV value (RV0).

In RAN1#107-e meeting, effort has also been made to integrate the two options shown in FIGS. 3A-B. The specific integration solution is provided in Table 1 below. Some examples of the disclosed techniques with respect to the integrated solution are further described in the following example Embodiments 5-8.

TABLE 1

| Integration Solution Combining Two Options |
|---|

For the determination of the index of the starting coded bit in a transmitted slot for TBoMS:
- For the first TBoMS repetition:
  - For the first allocated slot for the first TBoMS repetition, the index of the starting coded bit S1 is determined based on the applied redundancy version.
  - For the second allocated slot for the first TBoMS repetition, Option B is used, where the index of the starting coded bit for the second slot of the first TBoMS repetition is given by $s_2 = s_1 + offset_1$, where (Note from FL: only one or none of the following two sub-option is downselected)
    - Option B1:
      $$offset_1 = (N_{RE}^1 - Q'_{ACK,1} - Q'_{CSI-1,1} - Q'_{CSI-2,1}) * q$$
      or
    - Option B2:
      $$offset_1 = (N_{RE}^1) * q * \alpha,$$ where $\alpha$ is a higher layer parameter (can reuse existing RRC parameter scaling in PUSCH-Config)]
  - For the i-th slot allocated for the first TBoMS repetition, with $2 < i \leq N$, Option C is used.
- For all other TBoMS repetitions, if any:
  - For the first allocated slot for all other TBoMS repetitions, the index of the starting coded bit is determined based on the applied redundancy version.
  - For the i-th slot allocated for all other TBoMS repetitions, with $1 < i \leq N$, Option C is used.

Where Option B and Option C are as follows:
- Option B: for each transmitted slot for TBoMS, the index of the starting coded bit in the circular buffer is the index continuous from the position of the last bit selected in the previous allocated slot
- Option C: for each transmitted slot for TBoMS, the index of the starting coded bit in the circular buffer is the index continuous from the position of the last bit selected in the previous allocated slot, regardless of whether UCI multiplexing occurred in the previous allocated slot or not.

TABLE 1-continued

| Integration Solution Combining Two Options |
| --- |

Note: the following definition based on existing logics in TS 38.212 are used in the text above:

- q is the modulation order
- $N_{RE}^{k-1}$ is the number of REs available in the (k-1)-th slot for transmission and is given by $M_{SC}^{PUSCH} * N_{symb,per\ slot}^{PUSCH}$, where
  - $M_{SC}^{PUSCH}$ is the scheduled bandwidth of the TBOMS transmission, expressed as a number of subcarriers.
  - $N_{symb,per\ slot}^{PUSCH}$ is the number of symbols allocated per slot of TBOMS as per the indicated/configured row of TDRA table.
- $Q'_{ACK}$, $Q'_{CSI-1}$, and $Q'_{CSI-2}$ are the number of coded modulation symbols for ACK and CSI payloads in the first slot and follow the definitions in Section 6.3.2.4 of TS 38.212, with $Q'_{ACK} = 0$ if $O_{ACK} \leq 2$.

15

Embodiment 5

This embodiment accounts for the impact of different lengths of HARQ-ACK information in the integrated solution. In some embodiments, the offset calculation for Option B1 and the definition of $Q'_{ACK}$ can be modified as shown in Table 2.

TABLE 2

| One Example Offset Calculation and $Q'_{ACK}$ Definition |
| --- |

- Option B1:
  If HARQ-ACK less than or equal to 2bits ($O_{ACK} \leq 2$)
       $offset_1 = (N_{RE}^1 - Q'_{CSI-1,1} - Q'_{CSI-2,1}) * q + 1$
  If HARQ-ACK lager than ($O_{ACK} > 2$)
       $offset_1 = (N_{RE}^1 - Q'_{ACK,1} - Q'_{CSI-1,1} - Q'_{CSI-2,1}) * q + 1$
- Option B2:
       $offset_1 = (N_{RE}^1) * q * \alpha + 1$, where a is a higher layer parameter (can reuse existing RRC parameter scaling in PUSCH-Config)]

...

- $Q'_{ACK}$, $Q'_{CSI-1}$, and $Q'_{CSI-2}$ are the number of coded modulation symbols for ACK and CSI payloads in the first slot and follow the definitions in Section 6.3.2.4 of TS 38.212.

Embodiment 6

40

In some embodiments, for the second allocated slot for the first TBoMS repetition, the index of the starting coded bit for the second slot of the first TBoMS repetition can be defined as $s_2 = s_1 + offset_1 + 1$. The offset calculation for Option B1 and the definition of $Q'_{ACK}$ can be modified as shown in Table 3.

TABLE 3

| Another Example Offset Calculation and $Q'_{ACK}$ Definition |
| --- |

- Option B1:
  If HARQ-ACK less than or equal to 2bits ($O_{ACK} \leq 2$)
       $offset_1 = (N_{RE}^1, -Q'_{CSI-1,1} - Q'_{CSI-2,1}) * q$
  If HARQ-ACK lager than ($O_{ACK} > 2$)
       $offset_1 = (N_{RE}1 - Q'_{ACK,1} - Q'_{CSI-1,1} - Q_{CSI-2,1}) * q$

...

- $Q'_{ACK}$, $Q'_{CSI-1}$, and $Q'_{CSI-2}$ are the number of coded modulation symbols for ACK and CSI payloads in the first slot and follow the definitions in Section 6.3.2.4 of TS 38.212.

Embodiment 7

60

In some embodiments, for the second allocated slot for the first TBoMS repetition, the index of the starting coded bit for the second slot of the first TBoMS repetition can be defined as $S_2 = E_1 + 1$ where $E_1$ is the index of the last coded bit of the first allocated slot for the first TBoMS repetition. The offset calculation for Option B1 and the definition of $Q'_{ACK}$ can be modified as shown in Table 4.

TABLE 4

Yet Another Example Offset Calculation and $Q'_{ACK}$ Definition

- Option B1:
  If HARQ-ACK less than or equal to 2bits ($O_{ACK} \leq 2$)
  $$\text{offset}_1 = (Q'_{CSI-1,1} + Q'_{CSI-2,1})^*q$$
  If HARQ-ACK lager than ($O_{ACK} > 2$)
  $$\text{offset}_1 = (Q'_{ACK,1} + Q'_{CSI-1,1} + Q'_{CSI-2,1})^*q$$
  or
- Option B2:
  $$\text{offset}_1 = (N_{RE}{}^1)^*q^*(1-\alpha), \text{ where } \alpha \text{ is a higher layer parameter}$$
  (can reuse existing RRC parameter scaling in PUSCH-Config)]

...

- $Q'_{ACK}$, $Q'_{CSI-1}$, and $Q'_{CSI-2}$ are the number of coded modulation symbols for ACK and CSI payloads in the first slot and follow the definitions in Section 6.3.2.4 of TS 38.212.

Embodiment 8

In some embodiments, the integration or combination of the two options can be modified for different scenarios. For example, Option B can be used for the DG-PUSCH TBoMS or TBoMS repetition, and Option C can be used for the CG-PUSCH TBoMS or TBoMS repetition. Option B and Option C are as follows:

- Option B: for each transmitted slot for TBoMS, the index of the starting coded bit in the circular buffer is the index continuous from the position of the last bit selected in the previous allocated slot
- Option C: for each transmitted slot for TBoMS, the index of the starting coded bit in the circular buffer is the index continuous from the position of the last bit selected in the previous allocated slot, regardless of whether UCI multiplexing occurred in the previous allocated slot or not.

Example frequency hopping patterns for TBoMS transmissions are described in the following example Embodiments 9-12.

Embodiment 9

For the interaction between inter-slot frequency hopping and Demodulation Reference Signal (DMRS) bundling for PUSCH/PUCCH repetitions, a UE performs the hopping intervals determination, nominal time domain window (TDW) determination, and actual TDW determination in a sequential ordering as follows: "hopping intervals determination" -> "nominal TDW determination" -> "actual TDW determination."

The duration of a nominal TDW is given by PUSCH-TimeDomainWindowLength or PUCCH-TimeDomainWindowLength if configured, or computed as ([maxDMRS-BundlingDuration], M), if PUSCH-TimeDomainWindowLength or PUCCH-TimeDomainWindowLength is not configured. Here, M is the total time duration in consecutive slots of PUSCH/PUCCH transmissions and maxDMRS-BundlingDuration is reported by UE capability. Whether the hopping interval is configured or not is up to network configuration. If the hopping interval is not configured, the default hopping interval is same as the nominal TDW length. The terms "the duration of a nominal TDW" and "the nominal TDW length" may be mixed used in the application, but they have the same meaning unless otherwise specified. The PUSCH repetition includes PUSCH repetition Type A, TB processing over multiple slots (TBoMS) and TBoMS repetition.

Frequency hopping pattern designs for PUSCH repetitions are used as an example in the following descriptions.

The designs can also be applied to PUCCH repetition, TBoMS and/or TBoMS repetitions, and can also be applied to unpaired spectrum.

The frequency hopping pattern is determined based on at least the hopping interval. If the hopping interval is configured and denoted as H, in case of inter-slot frequency hopping and DMRS bundling for PUSCH repetition is enabled, the starting RB during slot $n_s{}^\mu$ is given by:

$$RB_{start}(n_s^\mu) = \begin{cases} RB_{start}, & \lfloor n_s^\mu/H \rfloor \bmod 2 = 0 \\ (RB_{start} + RB_{offset}) \bmod N_{BWP}^{size}, & \lfloor n_s^\mu/H \rfloor \bmod 2 = 1 \end{cases},$$

Figure 13:
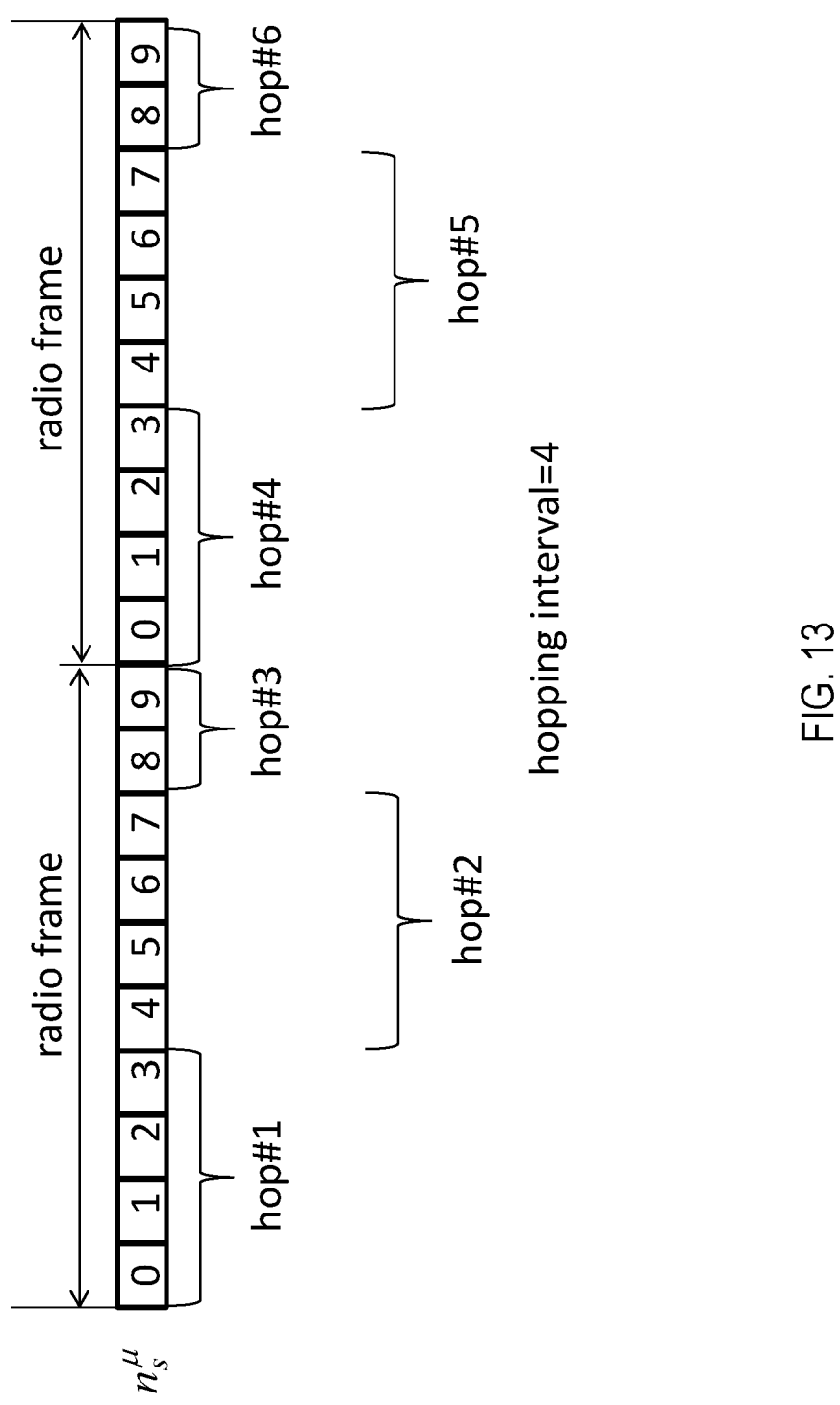
FIG. 13 illustrate examples of the frequency hopping pattern with an assumption that the hopping interval is 4 slots in accordance with one or more embodiments of the present application.

Here, $n_s{}^\mu$ is the current slot number within a radio frame, $RB_{start}$ is the starting RB within the UL BWP, as calculated from the resource block assignment information of resource allocation and $RB_{offset}$ is the frequency offset in RBs between the two frequency hops. In this embodiment, two frequency hops are assumed. FIG. 13 illustrate examples of the frequency hopping pattern with an assumption that the hopping interval is 4 slots in accordance with one or more embodiments of the present application. As can be seen, the frequency hopping pattern repeats every radio frame. The above embodiments can also be applied to unpaired spectrum.

Embodiment 10

In this embodiment, the frequency hopping pattern can be determined based on at least the hopping interval. If the hopping interval is configured and denoted as H, in case of inter-slot frequency hopping and DMRS bundling for PUSCH repetition is enabled, the starting RB during slot $n_s{}^\mu$ is given by:

$$RB_{start}(n_s^\mu) = \begin{cases} RB_{start}, & \lfloor n_s^\mu/H \rfloor \bmod 2 = 0 \\ (RB_{start} + RB_{offset}) \bmod N_{BWP}^{size}, & \lfloor n_s^\mu/H \rfloor \bmod 2 = 1 \end{cases},$$

Figure 14:
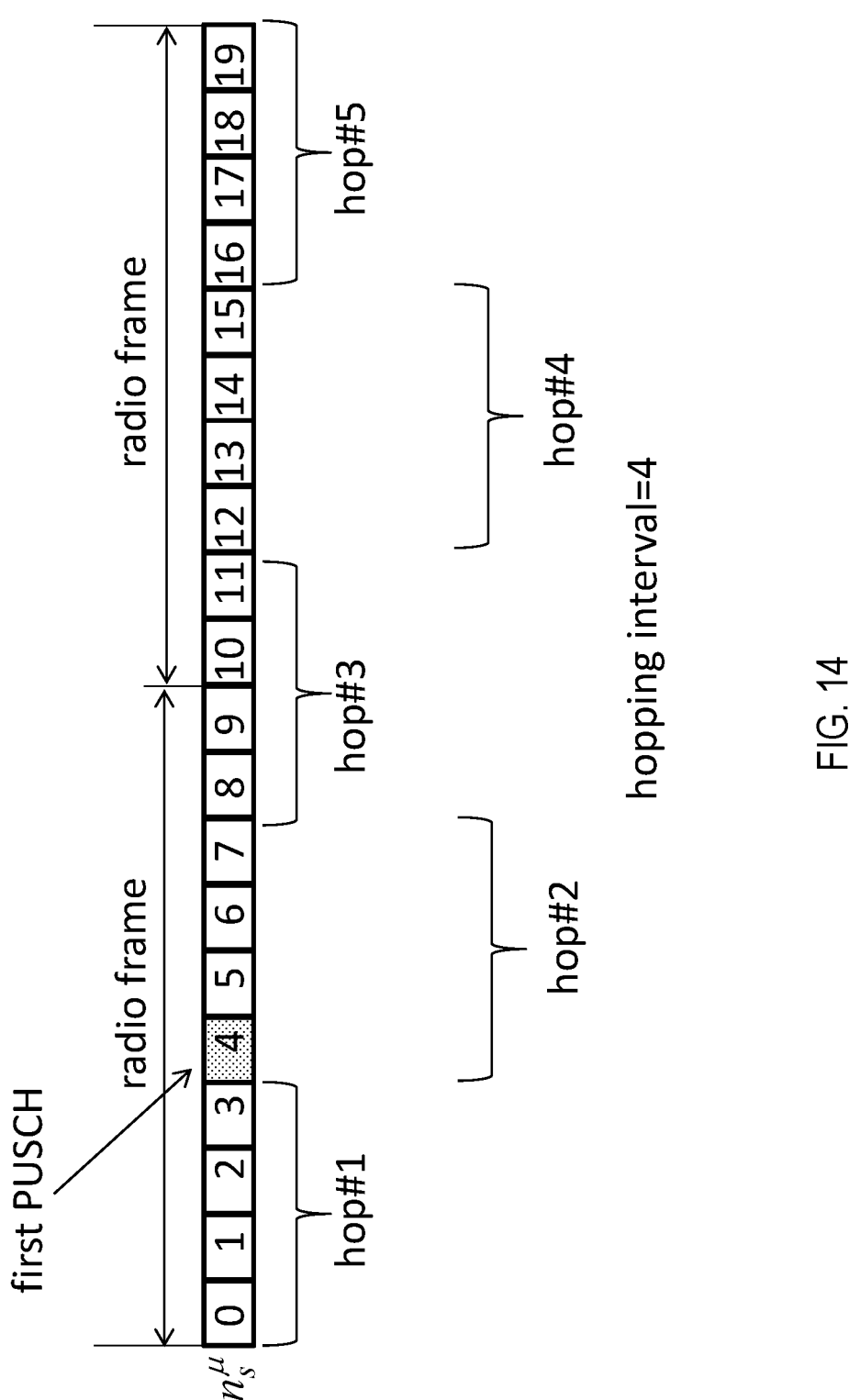
FIG. 14 illustrate another example of the frequency hopping pattern design with an assumption that the hopping interval is 4 slots in accordance with one or more embodiments of the present application.

Here, $n_s{}^\mu$ is the slot number starting from a radio frame boundary with the first PUSCH transmission and each subsequent slot increasing accordingly regardless of whether or not the UE transmits the PUSCH in the slot, $RB_{start}$ is the starting RB within the UL BWP, as calculated from the resource block assignment information of resource allocation and $RB_{offset}$ is the frequency offset in RBs between the two frequency hops. In this embodiment, two frequency hops are assumed. FIG. 14 illustrate another example of the frequency hopping pattern design with an assumption that the hopping interval is 4 slots in accordance with one or more embodiments of the present application.

Embodiment 11

In this embodiment, if the hopping interval is configured and denoted as H, in case of inter-slot frequency hopping and DMRS bundling for PUSCH repetition is enabled, the starting RB during slot $n_s^{\mu}$ is given by:

$$RB_{start}(n_s^{\mu}) = \begin{cases} RB_{start}, & \lfloor n_s^{\mu}/H \rfloor \bmod 2 = 0 \\ (RB_{start} + RB_{offset}) \bmod N_{BWP}^{size}, & \lfloor n_s^{\mu}/H \rfloor \bmod 2 = 1 \end{cases}$$

Figure 15:
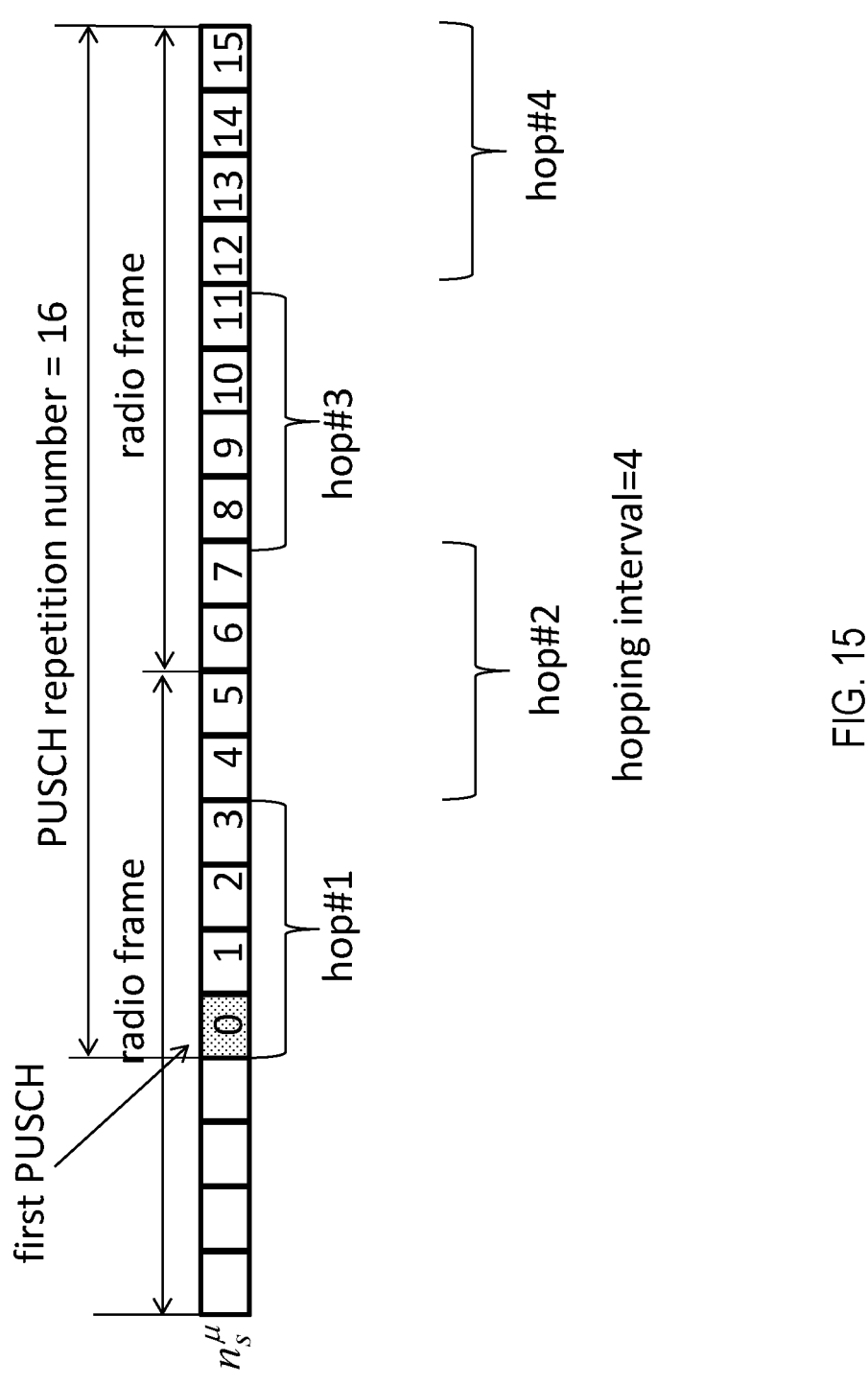
FIG. 15 illustrates yet another example of the frequency hopping pattern design with an assumption that the hopping interval is 4 slots in accordance with one or more embodiments of the present application.

Here, $n_s^{\mu}$ is the slot number started from the first PUSCH transmission with number 0 and each subsequent slot until the UE transmits the PUSCH in M slots is counted regardless of whether or not the UE transmits the PUSCH in the slot, $RB_{start}$ is the starting RB within the UL BWP, as calculated from the resource block assignment information of resource allocation and $RB_{offset}$ is the frequency offset in RBs between the two frequency hops. In this embodiment, two frequency hops are assumed. FIG. 15 illustrates yet another example of the frequency hopping pattern design with an assumption that the hopping interval is 4 slots in accordance with one or more embodiments of the present application.

Figure 16:
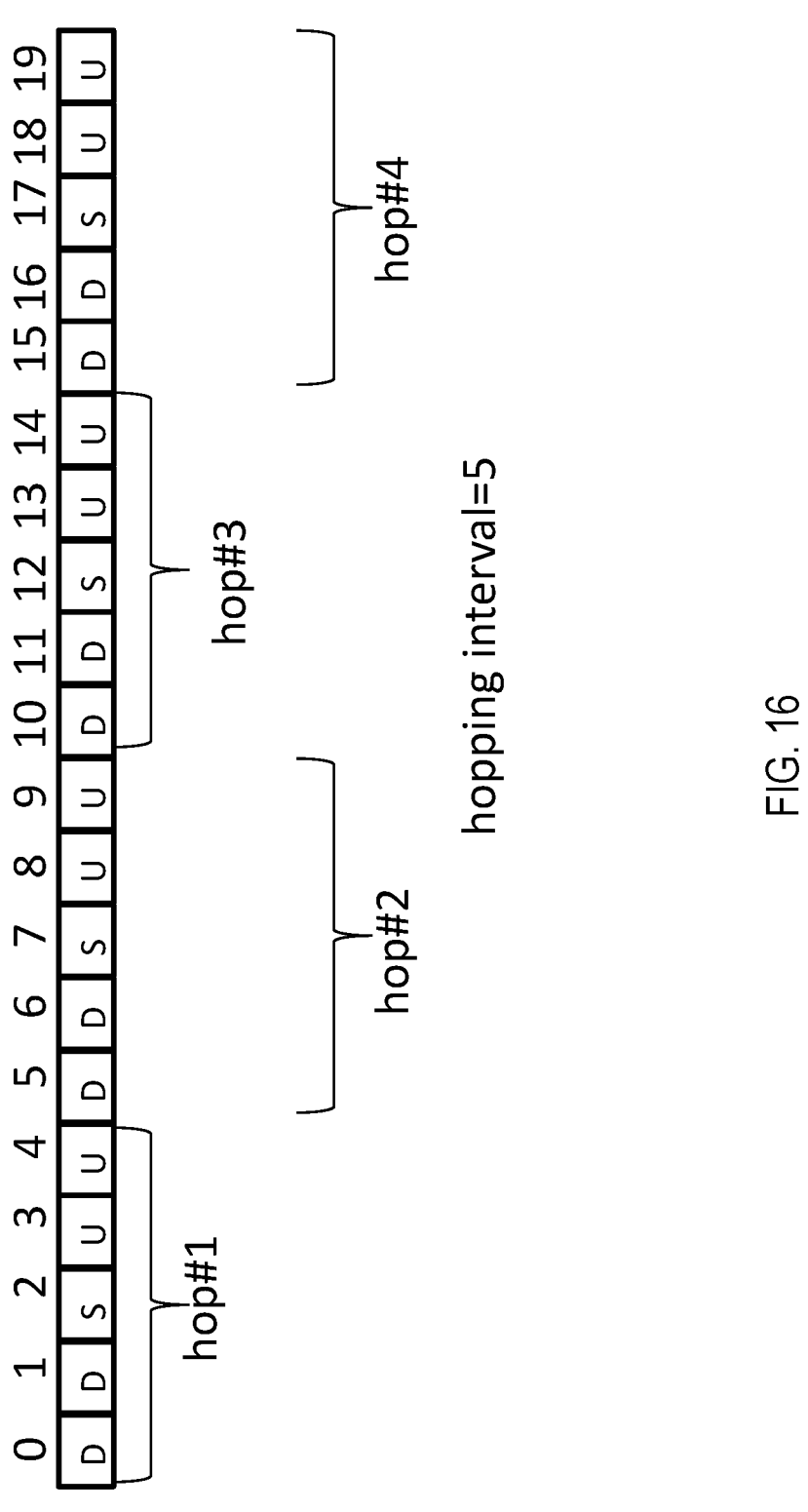
FIG. 16 illustrates an example of the frequency hopping pattern design with an assumption that the hopping interval is 5 slots in accordance with one or more embodiments of the present application.

Considering the frame structure of unpaired spectrum, the hopping interval can be configured to 5 or 10. FIG. 16 illustrates an example of the frequency hopping pattern design with an assumption that the hopping interval is 5 slots in accordance with one or more embodiments of the present application.

Embodiment 12

This embodiment describes hopping interval determination when both hopping interval and nominal TDW length are not configured. If both hopping interval and nominal TDW length are not configured, the determination of hopping interval can be considered based on the following:

(1) The hopping interval equals to the default nominal TDW length, and the default nominal TDW length is computed as ([maxDMRS-BundlingDuration], M), if PUSCH-TimeDomainWindowLength is not configured, where M is the total time duration in consecutive slots of PUSCH transmissions and maxDMRS-BundlingDuration is reported by UE capability. If maxDMRS-BundlingDuration>=M, there can be only one hop during the whole PUSCH repetitions transmission. This is suitable for the case where the performance gain achieved by DMRS bundling is higher than that achieved by frequency hopping.

(2) The hopping interval equals to 1 (slot) and Rel-15/Rel-16 inter-slot frequency hopping is reused. For PUSCH repetition or TBoMS, the hopping interval equals to 1 (slot) and Rel-15/Rel-16 inter-slot frequency hopping for PUCCH repetition is reused or inter-slot frequency hopping method in Embodiment 10 and Embodiment 11 is used. In this case, DMRS bundling is not available since the UE will hop at each slot. This is suitable for the case where the performance gain achieved by frequency hopping is higher than that achieved by DMRS bundling.

In some embodiments, the hopping interval equals to $\lfloor M/2 \rfloor$ or $\lceil M/2 \rceil$, where M is the number of PUSCH repetitions assuming at most two hops are supported. In some embodiments, the first hopping interval is $\lceil M/2 \rceil$ and the second hoping interval is $\lfloor M/2 \rfloor$. In some embodiments, the first hopping interval is $\lfloor M/2 \rfloor$ and the second hoping interval is $\lceil M/2 \rceil$. If the number of frequency hops can be larger than 2, the hopping interval can be $\lfloor M/N_{hop} \rfloor$ or $|M/N_{hop}|$, where $N_{hop}$ is the number of frequency hops. After the hopping interval is determined, the frequency hopping pattern can be determined applying the methods described in Embodiment 9-11.

Some embodiments may preferably implement the following solutions.

A set of preferred solutions may include the following (e.g., as described with reference to Embodiments 1-4).

1. A method for wireless communication, comprising: performing, by a wireless device, a transmission of a transport block using multiple time units based on a restriction, wherein the transmission of the transport block is associated with a timeline that indicates when control information is transmittable from the wireless device to the base station, wherein the restriction specifies that no control information is transmitted in a first time unit that is used for transmitting a first part of the transport block, and wherein a second part of the transport block in a second time unit subsequent to the first time unit is punctured in the transmission or processed by rate-matching in response to a conflict between the transport block and the control information according to the timeline.

2. A method for wireless communication, comprising: receiving, by a base station, a transmission of a transport block from a wireless device using multiple time units based on a restriction, wherein the transmission of the transport block is associated with a timeline that indicates when control information is transmittable from the wireless device to the base station, wherein the restriction specifies that no control information is transmitted in a first time unit that is used for transmitting a first part of the transport block, and wherein a second part of the transport block in a second time unit subsequent to the first time unit is punctured in the transmission or processed by rate-matching in response to a conflict between the transport block and the control information according to the timeline.

3. The method of solution 1 or 2, wherein the transmission of the transport block is a first repetition of repetitive transmissions of the transport bock, and wherein the restriction is inapplicable to remaining repetitions of the repetitive transmissions.

4. The method of solution 1 or 2, wherein the transmission of the transport block is part of repetitive transmissions of the transport bock, and wherein the restriction is applicable to each repetition regardless of a redundancy version of the repetition.

5. The method of solution 1 or 2, wherein the transmission of the transport block is part of repetitive transmissions of the transport bock, and wherein the restriction is applicable to one or more repetitions of the transport block having a specific redundancy version.

6. A method for wireless communication, comprising: performing, by a wireless device, a transmission of a transport block using multiple time units based on a restriction, wherein the transmission of the transport block is associated with a timeline that indicates when control information is transmittable from the wireless device to the base station, wherein the timeline indicates a conflict between the control information and a part of the transport block in a first time unit, and wherein the restriction specifies that multiplexing of the control information and the part of the transport block is performed in a second time unit subsequent to the first time unit.

7. A method for wireless communication, comprising: receiving, by a base station, a transmission of a transport block from a wireless device using multiple time units based on a restriction, wherein the transmission of the transport block is associated with a timeline that indicates when control information is transmittable from the wireless device to the base station, wherein the timeline indicates a conflict between the control information and a part of the transport block in a first time unit, and wherein the restriction specifies that multiplexing of the control information and the part of the transport block is performed in a second time unit subsequent to the first time unit.

8. The method of solution 6 or 7, wherein the second time unit is a last time unit for the transmission of the transport block.

9. The method of any of solution 6 to 8, wherein the timeline specifies that a part of the control information in the second time unit is omitted in the transmission in response to the multiplexing.

10. The method of any of solution 6 to 9, wherein the timeline specifies that a first part of the control information is scheduled to be transmittable in the second time unit, and wherein the restriction specifies that remaining part of the control information is combined with the first part of the control information in the transmission.

11. The method of solution 10, wherein a number of bits in the subsequent time unit for carrying the control information is recalculated by the wireless device.

12. The method of solution 10 or 11, wherein, in response to the multiplexing, the control information in different time units specified by the timeline is concatenated.

13. The method of solution 12, wherein the control information is concatenated according to a Semi-Persistent Scheduling index.

14. The method of any of solution 1 to 13, wherein the multiple time units are consecutive in a time domain.

15. The method of any of solution 1 to 13, wherein the multiple time units are non-consecutive in a time domain.

16. The method of any of solution 1 to 15, wherein the time unit comprises a slot.

17. The method of any of solution 1 to 13, wherein the control information comprises at least one of: Hybrid Automatic Repeat Request (HARQ) Acknowledgment (ACK) carried by N bits, N being smaller than or equal to two bits; HARQ ACK carried by M bits, M being greater than two bits; a first part of Channel Station Information (CSI); or a second part of CSI.

18. The method of any of solution 1 to 14, wherein the transmission of the transport block comprises a Configured-Grant (CG) Physical Uplink Shared Channel (PUSCH) transmission or a Dynamic-Grant (DG)

PUSCH transmission, wherein the CG-PUSCH transmission further comprises a Type 2 CG-PUSCH transmission.

19. The method of any of solution 1 to 18, wherein a grant message from the base station to the wireless device includes a parameter indicating the restriction associated with the timeline.

20. The method of solution 19, wherein the parameter indicates a time domain location of the second time unit.

21. The method of any of solution 1 to 20, wherein a Radio Reconfiguration Configuration (RRC) message from the base station to the wireless device indicates whether the restriction is enabled for the transmission.

22. The method of any of solution 1 to 21, wherein the restriction is applicable to a new data transmission or a data retransmission.

23. The method of any of solution 1 to 22, wherein the restriction is applicable to a single transmission or repetitive transmissions of the transmission.

Figure 17:
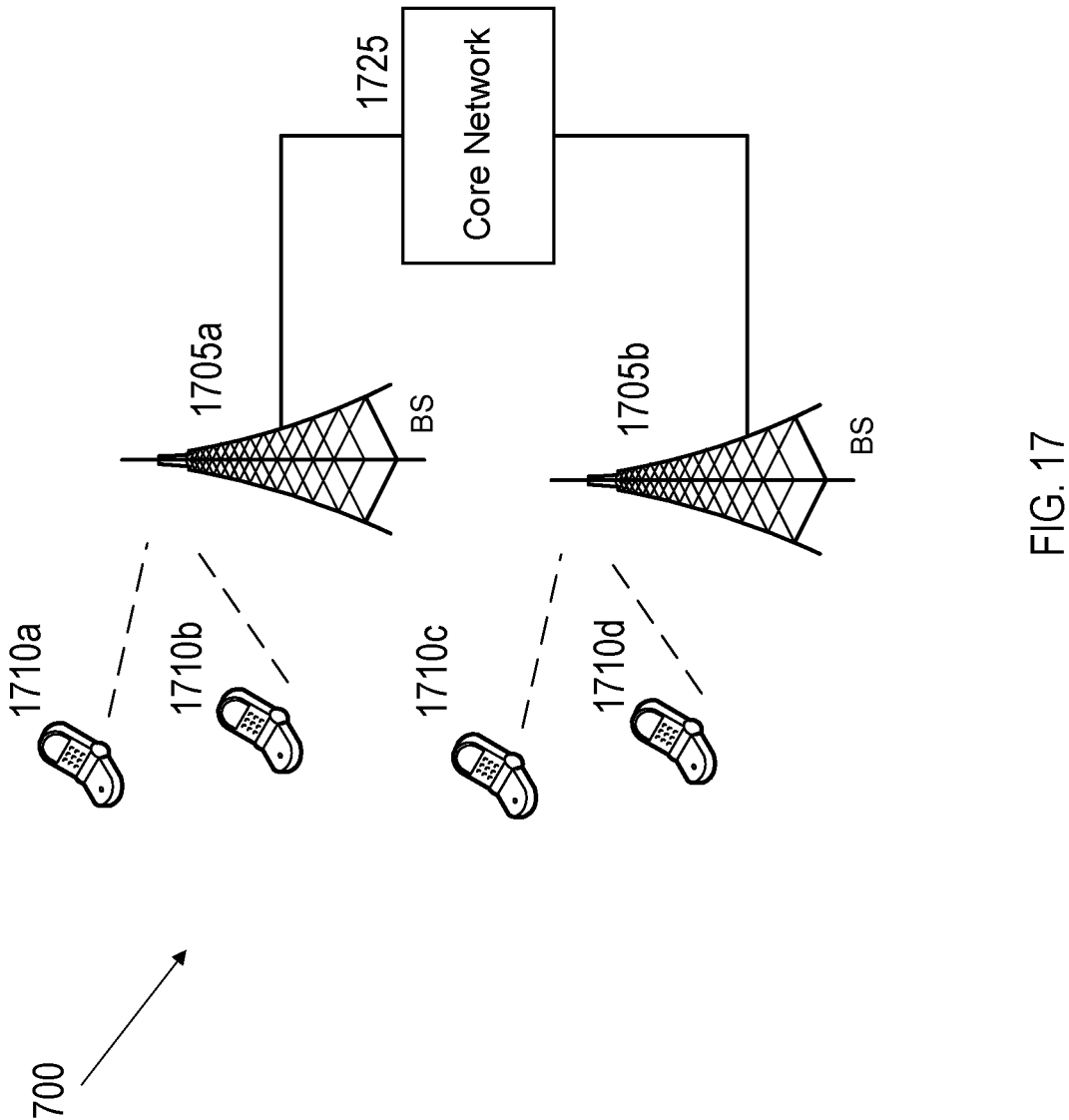
FIG. 17 shows an example of a wireless communication system where techniques in accordance with one or more embodiments of the present technology can be applied.

FIG. 17 shows an example of a wireless communication system 1700 where techniques in accordance with one or more embodiments of the present technology can be applied. A wireless communication system 1700 can include one or more base stations (BSs) 1705a, 1705b, one or more wireless devices (or UEs) 1710a, 1710b, 1710c, 1710d, and a core network 1725. A base station 1705a, 1705b can provide wireless service to user devices 1710a, 1710b, 1710c and 1710d in one or more wireless sectors. In some implementations, a base station 1705a, 1705b includes directional antennas to produce two or more directional beams to provide wireless coverage in different sectors. The core network 1725 can communicate with one or more base stations 1705a, 1705b. The core network 1725 provides connectivity with other wireless communication systems and wired communication systems. The core network may include one or more service subscription databases to store information related to the subscribed user devices 1710a, 1710b, 1710c, and 1710d. A first base station 1705a can provide wireless service based on a first radio access technology, whereas a second base station 1705b can provide wireless service based on a second radio access technology. The base stations 1705a and 1705b may be co-located or may be separately installed in the field according to the deployment scenario. The user devices 1710a, 1710b, 1710c, and 1710d can support multiple different radio access technologies. The techniques and embodiments described in the present document may be implemented by the base stations of wireless devices described in the present document.

Figure 18:
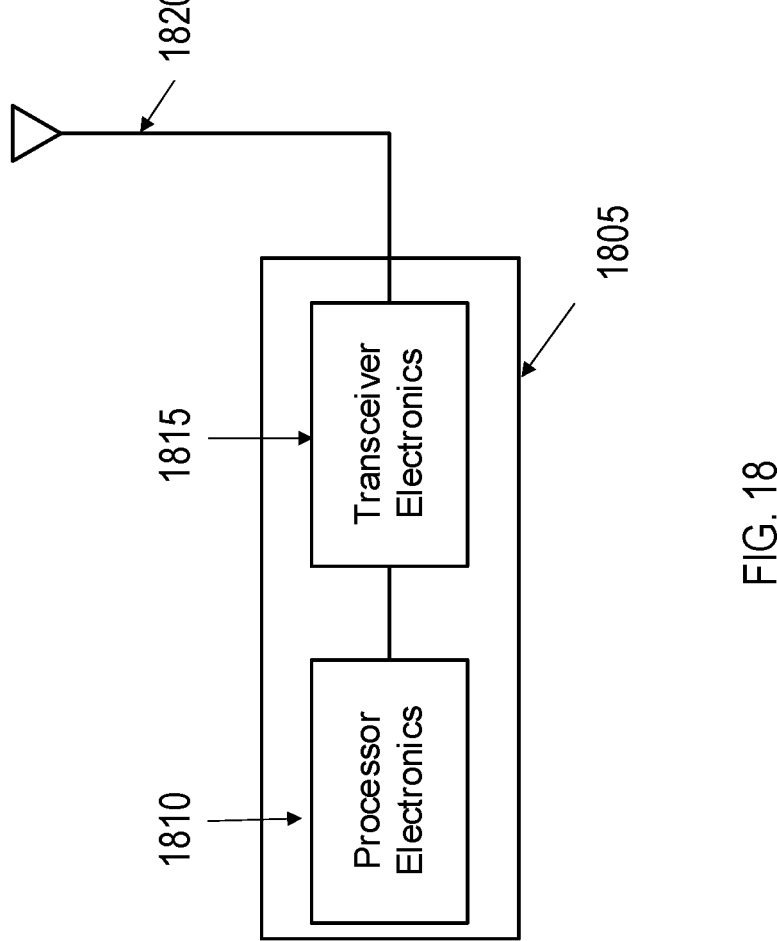
FIG. 18 is a block diagram representation of a portion of a radio station in accordance with one or more embodiments of the present technology can be applied.

FIG. 18 is a block diagram representation of a portion of a radio station in accordance with one or more embodiments of the present technology can be applied. A radio station 1805 such as a network node, a base station, or a wireless device (or a user device, UE) can include processor electronics 1810 such as a microprocessor that implements one or more of the wireless techniques presented in this document. The radio station 1805 can include transceiver electronics 1815 to send and/or receive wireless signals over one or more communication interfaces such as antenna 1820. The radio station 1805 can include other communication interfaces for transmitting and receiving data. Radio station 1805 can include one or more memories (not explicitly shown) configured to store information such as data and/or instructions. In some implementations, the processor electronics 1810 can include at least a portion of the transceiver electronics 1815. In some embodiments, at least some of the disclosed techniques, modules or functions are implemented using the radio station 1805. In some embodiments, the radio station 1805 may be configured to perform the methods described herein.

It will be appreciated that the present document discloses techniques that can be embodied in various embodiments to reduce and/or eliminate mismatches between the base station and the UEs caused by DCI transmission or detection failures. The disclosed techniques can also be implemented to reduce information loss due to puncturing of data bits, thereby improving the performance of TBoMS transmissions. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for wireless communication, comprising:

performing, by a wireless device, a transmission of a transport block to a base station using multiple time units based on a restriction, wherein the transmission of the transport block is associated with a timeline that indicates when control information is transmittable from the wireless device to the base station, wherein the restriction specifies that no control information is transmitted in a first time unit that is used for transmitting a first part of the transport block, wherein the transmission of the control information is postponed to a second time unit subsequent to the first time unit, and wherein a second part of the transport block in the second time unit subsequent to the first time unit is punctured in the transmission or processed by rate matching in response to a conflict between the transport block and the control information according to the timeline.

2. The method of claim 1, wherein the transmission of the transport block is a first repetition of repetitive transmissions of the transport block, and wherein the first repetition of the repetitive transmission of the transport block is postponed.

3. The method of claim 1, wherein the transmission of the transport block is part of repetitive transmissions of the transport block, and wherein the restriction is applicable to each repetition regardless of a redundancy version of the repetition.

4. The method of claim 1, wherein the transmission of the transport block is part of repetitive transmissions of the transport block, and wherein the restriction is applicable to one or more repetitions of the transport block having a specific redundancy version.

5. A method for wireless communication, comprising:

receiving, by a base station, a transmission of a transport block from a wireless device using multiple time units based on a restriction, wherein the transmission of the transport block is associated with a timeline that indicates when control information is transmittable from the wireless device to the base station, wherein the restriction specifies that no control information is transmitted in a first time unit that is used for transmitting a first part of the transport block, wherein the transmission of the control information is postponed to a second time unit subsequent to the first time unit, and wherein a second part of the transport block in the second time unit subsequent to the first time unit is punctured in the transmission or processed by rate matching in response to a conflict between the transport block and the control information according to the timeline.

6. The method of claim 5, wherein the transmission of the transport block is a first repetition of repetitive transmissions of the transport block, and wherein the first repetition of the repetitive transmission of the transport block is postponed.

7. The method of claim 5, wherein the transmission of the transport block is part of repetitive transmissions of the transport block, and wherein the restriction is applicable to each repetition regardless of a redundancy version of the repetition.

8. The method of claim 5, wherein the transmission of the transport block is part of repetitive transmissions of the transport block, and wherein the restriction is applicable to one or more repetitions of the transport block having a specific redundancy version.

9. A wireless device, comprising:

at least one processor configured to:

perform, via a transmitter, a transmission of a transport block to a base station using multiple time units based on a restriction, wherein the transmission of the transport block is associated with a timeline that indicates when control information is transmittable from the wireless device to the base station, wherein the restriction specifies that no control information is transmitted in a first time unit that is used for transmitting a first part of the transport block, wherein the transmission of the control information is postponed to a second time unit subsequent to the first time unit, and wherein a second part of the transport block in the second time unit subsequent to the first time unit is punctured in the transmission or processed by rate matching in response to a conflict between the transport block and the control information according to the timeline.

10. The wireless device of claim 9, wherein the transmission of the transport block is a first repetition of repetitive transmissions of the transport block, and wherein the first repetition of the repetitive transmission of the transport block is postponed.

11. The wireless device of claim 9, wherein the transmission of the transport block is part of repetitive transmissions of the transport block, and wherein the restriction is applicable to each repetition regardless of a redundancy version of the repetition.

12. The wireless device of claim 9, wherein the transmission of the transport block is part of repetitive transmissions of the transport block, and wherein the restriction is applicable to one or more repetitions of the transport block having a specific redundancy version.

13. A base station, comprising:

at least one processor configured to:

receive, via a receiver, a transmission of a transport block from a wireless device using multiple time units based on a restriction, wherein the transmission of the transport block is associated with a timeline that indicates when control information is transmittable from the wireless device to the base station, wherein the restriction specifies that no control information is transmitted in a first time unit that is used for transmitting a first part of the transport block, wherein the transmission of the control information is postponed to a second time unit subsequent to the first time unit, and wherein a second part of the transport block in the second time unit subsequent to the first time unit is punctured in the transmission or processed by rate matching in response to a conflict between the transport block and the control information according to the timeline.

14. The base station of claim 13, wherein the transmission of the transport block is a first repetition of repetitive transmissions of the transport block, and wherein the first repetition of the repetitive transmission of the transport block is postponed.

15. The base station of claim 13, wherein the transmission of the transport block is part of repetitive transmissions of the transport block, and wherein the restriction is applicable to each repetition regardless of a redundancy version of the repetition.

16. The base station of claim 13, wherein the transmission of the transport block is part of repetitive transmissions of the transport block, and wherein the restriction is applicable to one or more repetitions of the transport block having a specific redundancy version.

* * * * *